United States Patent
Kim et al.

(10) Patent No.: US 11,068,427 B2
(45) Date of Patent: Jul. 20, 2021

(54) METHOD FOR ESTABLISHING CONNECTION TO EXTERNAL DEVICE VIA USB INTERFACE, AND ELECTRONIC DEVICE THEREFOR

(71) Applicant: Samsung Electronics Co., Ltd., Suwon-si (KR)

(72) Inventors: Byung-Jun Kim, Seoul (KR); Dong-Rak Shin, Gwangju-si (KR); Woo-Kwang Lee, Suwon-si (KR); Jae-Jin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/636,764

(22) PCT Filed: Aug. 22, 2018

(86) PCT No.: PCT/KR2018/009637
§ 371 (c)(1),
(2) Date: Feb. 5, 2020

(87) PCT Pub. No.: WO2019/039851
PCT Pub. Date: Feb. 28, 2019

(65) Prior Publication Data
US 2020/0167303 A1 May 28, 2020

(30) Foreign Application Priority Data
Aug. 23, 2017 (KR) .................. 10-2017-0106964

(51) Int. Cl.
*G06F 13/38* (2006.01)
*G06F 13/42* (2006.01)

(52) U.S. Cl.
CPC ........ *G06F 13/385* (2013.01); *G06F 13/4286* (2013.01); *G06F 2213/0042* (2013.01)

(58) Field of Classification Search
CPC ..................................................... G08B 25/14
See application file for complete search history.

(56) References Cited

U.S. PATENT DOCUMENTS 9,026,712 B2 * 5/2015 Kwidzinski ........... G06F 13/426
710/313
2006/0282567 A1 12/2006 Bhesania et al.
(Continued)

FOREIGN PATENT DOCUMENTS

EP 2 813 945 A1 12/2014
WO 2009/138641 A1 11/2009

*Primary Examiner* — Henry Tsai
*Assistant Examiner* — Juanito Borromeo
(74) *Attorney, Agent, or Firm* — Jefferson IP Law, LLP

(57) ABSTRACT

An electronic device according to an embodiment of the present invention comprises: a universal serial bus (USB) interface; a processor electrically connected to the USB interface; and a memory electrically connected to the processor, wherein the memory may store instructions configured to, when executed, cause the processor to: enter a security mode; in the security mode, receive, from an external device connected to the electronic device via the USB interface, a USB class code corresponding to the external device; determine whether the USB class code is included in a white list of connectable devices allowed to be connected to the electronic device in the security mode; and control a communication connection between the external device and the electronic device according to whether the USB class code is included in the white list. Other embodiments are also possible.

15 Claims, 15 Drawing Sheets

(56) References Cited

U.S. PATENT DOCUMENTS

| | | |
|---|---|---|
| 2011/0047305 A1 | 2/2011 | Kim et al. |
| 2013/0014221 A1 | 1/2013 | Moore et al. |
| 2014/0215637 A1* | 7/2014 | Moore .................... G06F 21/57 726/27 |
| 2014/0268229 A1* | 9/2014 | Kempka ............... G06F 9/4413 358/1.15 |
| 2015/0365237 A1 | 12/2015 | Soffer |
| 2016/0182539 A1 | 6/2016 | Edwards et al. |
| 2016/0299865 A1 | 10/2016 | Hetzler et al. |
| 2016/0328579 A1 | 11/2016 | Jois et al. |

\* cited by examiner

ID
METHOD FOR ESTABLISHING CONNECTION TO EXTERNAL DEVICE VIA USB INTERFACE, AND ELECTRONIC DEVICE THEREFOR

CROSS-REFERENCE TO RELATED APPLICATION(S)

This application is a U.S. National Stage application under 35 U.S.C. § 371 of an International application filed on Aug. 22, 2018 and assigned application number PCT/KR2018/009637, which claimed the priority of a Korean patent application filed on Aug. 23, 2017 in the Korean Intellectual Property Office and assigned Serial number 10-2017-0106964, the entire disclosure of which is hereby incorporated by reference.

BACKGROUND

1. Field

The disclosure generally relates to a method for establishing connection to an external device via a universal serial bus (USB) interface, and an electronic device therefor.

2. Description of the Related Art

A mobile device management (MDM) policy is used as a security solution in a security workplace for the purpose of security and preventing secrete divulgation. For example, if such MDM policy is applied to electronic devices including a USB interface, a function of the USB interface cannot be used in the electronic devices.

For example, in a case where some accessories (e.g., Dex Dock, Gear VR, etc.) are connected to the electronic device, they can get access to a memory of the electronic device, and thus application of the security policy may be required. If the security policy is applied to the electronic device, although an accessory (e.g., a docking station, a head mounted display (HMD), etc.) is connected to the electronic device through the USB interface, the electronic device cannot use the accessory. In contrast, even in the case of the accessories, which are not relevant or less relevant to the security policy, such as hardware interface design (HID) devices such as a keyboard and a mouse, audio equipment, printers, and so on, if the MDM policy is applied to the electronic device, the electronic device cannot use the accessories in the same way. Further, once the policy, such as the MDM policy, for limiting the use of the USB interface is applied to the electronic device, the accessory connected through the USB interface cannot be used until the applied policy is released.

SUMMARY

According to aspects of the disclosure, an electronic device and method capable of flexibly adjusting whether not to be able to use an accessory connected through a USB interface are provided.

An electronic device according to an embodiment of the disclosure includes a universal serial bus (USB) interface, a processor electrically connected to the USB interface, and a memory electrically connected to the processor. The memory stores instructions configured to, when executed, cause the processor to enter a security mode, to receive, from an external device connected to the electronic device via the USB interface, a USB class code corresponding to the external device in the security mode, to determine whether the USB class code is included in a white list of connection allowable devices that are connectable to the electronic device in the security mode, and to control communication connection between the external device and the electronic device according to whether the USB class code is included in the white list.

A method of operating an electronic device according to an embodiment of the disclosure comprising entering a security mode, receiving, from an external device connected through a USB interface of the electronic device, a USB class code corresponding to the external device in the security mode, determining whether the USB class code is included in a white list of connection allowable devices that are connectable to the electronic device in the security mode, and controlling communication connection between the external device and the electronic device according to whether the USB class code is included in the white list.

An electronic device according to another embodiment of the disclosure includes a USB connector that uses a first data path or a second data path, a processor that is electrically connected to the USB interface, and a memory that is electrically connected to the processor. The memory stores instructions configured to, when executed, cause the processor to enter a security mode in which an external electronic device of a type selected using a list of allowable external electronic devices and/or USB classes allows an access to the electronic device through the USB connector, to sense the external electronic device including a display and a USB device is connected to the USB connector in the security mode, to connect a display port of the electronic device to a display port of the external device while USB data signals are not transmitted through the first data path, to be connected to the USB device for data transmission/reception, to perform USB enumeration at least partially based on the list, and to perform the data transmission/reception through the second data path after the USB enumeration.

According to various embodiments of the disclosure, an electronic device and method capable of flexibly adjusting whether not to be able to use an accessory connected through a USB interface can be provided.

According to various embodiments of the disclosure, an accessory that can be used by connection to an electronic device through a USB interface, and an accessory that cannot be used by connection to an electronic device through a USB interface can be individually configured.

DETAILED DESCRIPTION

Hereinafter, an electronic device according to various embodiments of the disclosure will be described with reference to the accompanying drawings. In various embodiments, the term "user" may indicate a person using an electronic device or a device (e.g. an artificial intelligence electronic device) using an electronic device.

Figure 1:
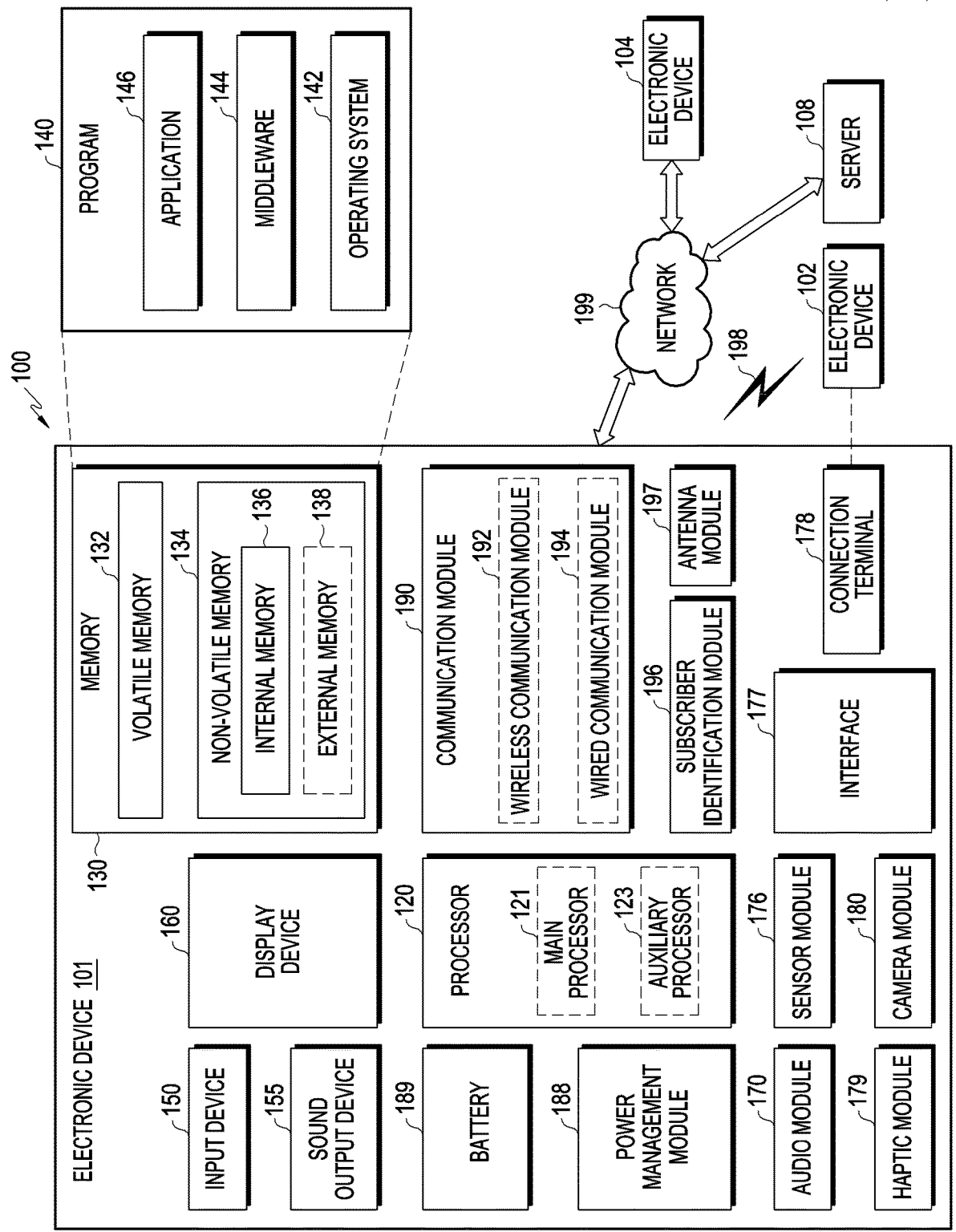
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiment, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor (AP)) and an auxiliary processor 123 that is operable independently from the main processor 121. In addition to, or instead of, the main processor 121, the auxiliary processor 120 may include an auxiliary processor 123 (e.g., a graphics processing unit (GPU), an image signal processor, a sensor hub processor, or a communication processor) that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123.

According to an embodiment, the processor 120 may identify (or recognize) an external device (e.g., an accessory) that can be used through the interface 177 or a connection terminal 178 in the electronic device 101 according to each operation mode of the electronic device 101. According to an embodiment, an accessory (e.g., an electronic device 102) may be connected through the connection terminal 178 (e.g., a universal serial bus (USB) connector), and a USB class code for identifying the accessory may be transmitted from the accessory to the processor 120. The processor 120 may check a type of the accessory on the basis of the USB class code, and determine a class driver (e.g., a driver program) for using the accessory.

According to an embodiment, the processor 120 may control the electronic device 101 such that the electronic device 101 is converted (or changed) to a security mode, for instance an accessory limitation mode. The accessory limitation mode may be an operation mode for limiting use of the external device, for instance the accessory (e.g., the electronic device 102) that is connected to the electronic device 101 by wire or wirelessly. The processor 120 may convert the operation mode of the electronic device 101 to the accessory limitation mode, for instance, according to a request to apply a mobile device management (MDM) policy from the other electronic device 104 or the server 108. According to an embodiment, the processor 120 may convert the operation mode of the electronic device 101 to the security mode (e.g., the accessory limitation mode) according to input of a user via the input unit 150 or the display unit 160. Further, even in a case where a present state of the electronic device 101 satisfies conversion conditions for conversion to the security mode (e.g., the accessory limitation mode), the processor 120 may convert the operation mode of the electronic device 101 to the accessory limitation mode. The conversion conditions may be transmitted from the other electronic device 104 or the server 108 to the electronic device 101 through the network 199 and be stored in the memory 130, or be input from a user via the input unit 150 or the display unit 160 and be stored in the memory 130.

According to an embodiment, if the electronic device 101 enters the security mode, for instance the accessory limitation mode, the processor 120 may inactivate a USB host API, and terminate connection with each of the external devices, for instance the accessories, connected through the interface 177 or the connection terminal 178. To terminate connection with each of the accessories connected through the connection terminal 178, the processor 120 may remove (or eliminate) channels established between the electronic device 101 and the accessories, and inactivate (or remove) class drivers (e.g., driver programs) for using the accessories.

A white list acting as information about connection allowable devices for which the connection to the electronic device 101 is allowed may be stored in the memory 130 of the electronic device 101, or a black list acting as information about connection unallowable devices for which the connection to the electronic device 101 is not allowed may be stored in the memory 130 of the electronic device 101. If the electronic device 101 is converted to the accessory limitation mode, the processor 120 may determine whether or not the external device, for instance the accessory, connected to the electronic device 101 using the white list or the black list is a device for which the connection to the electronic device 101 is allowed.

According to an embodiment, the white list is a list of the accessories, namely the connection allowable devices, which can be used in the accessory limitation mode, and may include USB class codes corresponding to the connection allowable devices. The black list is a list of the accessories, namely the connection unallowable devices, which cannot be used in the accessory limitation mode, and may include USB class codes corresponding to the connection unallowable devices. In the accessory limitation mode, the processor 120 may approve only connection with either the accessories registered with the white list among the accessories connected through the interface 177 and the connection terminal 178, or the accessories corresponding to the USB class codes included in the white list. Further, in the accessory limitation mode, the processor 120 may deny the connection to the accessories registered with the black list.

The memory 130 may store various data used by at least one component (e.g., the processor 120 or sensor module 176) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 150 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display 160 may include a touch circuitry or a pressure sensor capable of measuring the strength of a pressure with respect to a touch.

The audio module 170 may convert a sound into an electrical signal and vice versa. According to an embodiment, the audio module 170 may obtain the sound via the input device 150, or output the sound via the sound output device 155 or electronic device 101 (e.g., an accessory) (e.g., a speaker or a headphone) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., an accessory). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., an accessory).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a GNSS communication module) or a wired communication module 194 (e.g., an LAN communication module or a power-line communication module), and may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., an LAN or wide area network (WAN)). The above-enumerated types of communication modules 190 may be implemented in a single chip, where at least some of the modules are integrated, or individually in separate chips. According to an embodiment, the communication module 190 may be implemented in the form that includes a USB interface.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 and the electronic device 104 may be a device of the same type as or a different type than the electronic device 101. According to an embodiment, some or all of operations performed by the electronic device 101 may be performed in another electronic device or a plurality of other electronic devices. According to an embodiment, when the electronic device 101 has to perform a function or a service automatically or at a request, the electronic device 101 may request an external electronic device to perform at least some functions associated with the function or the service, instead of or in addition to executing the function or the service. The external electronic device having received the request may execute the requested function or additional function and deliver the execution result to the electronic device 101. The electronic device 101 may then process or further process the received result to provide the requested function or service. To that end, a cloud computing, distributed computing, or client-server computing technology may be used, for example.

An electronic device according to an embodiment of the disclosure includes: a USB interface; a processor that is electrically connected to the USB interface; and a memory that is electrically connected to the processor. The memory stores instructions configured to, when executed, cause the processor to enter a security mode, to receive, from an external device connected to the electronic device via the USB interface, a USB class code corresponding to the external device in the security mode, to determine whether the USB class code is included in a white list of connection allowable devices that are connectable to the electronic device in the security mode, and to control communication connection between the external device and the electronic device according to whether the USB class code is included in the white list.

An electronic device according to another embodiment of the disclosure includes: a USB connector that uses a first data path or a second data path; a processor that is electrically connected to the USB connector; and a memory that is electrically connected to the processor. The memory stores instructions configured to, when executed, cause the processor to enter a security mode in which an external electronic device of a type selected using a list of allowable external electronic devices and/or USB classes allows an access to the electronic device through the USB connector, to sense the external electronic device including a display and a USB device is connected to the USB connector in the security mode, to connect a display port of the electronic device to a display port of the external device while USB data signals are not transmitted through the first data path, to be connected to the USB device for data transmission/reception, to perform USB enumeration at least partially based on the list, and to perform the data transmission/reception through the second data path after the USB enumeration.

In a storage medium in which commands according to an embodiment of the disclosure are stored, the commands are configured to perform at least one process by at least one processor when executed by the at least one processor. The at least one process may include a process of entering a security mode, a process of receiving a USB class code corresponding to an external device from the external device connected to the USB interface of the electronic device in the security mode, a process of determining whether the USB class code is included in a white list of connection allowable devices that are connectable to the electronic device in the security mode, and a process of controlling communication connection between the external device and the electronic device according to whether the USB class code is included in the white list.

Figure 2:
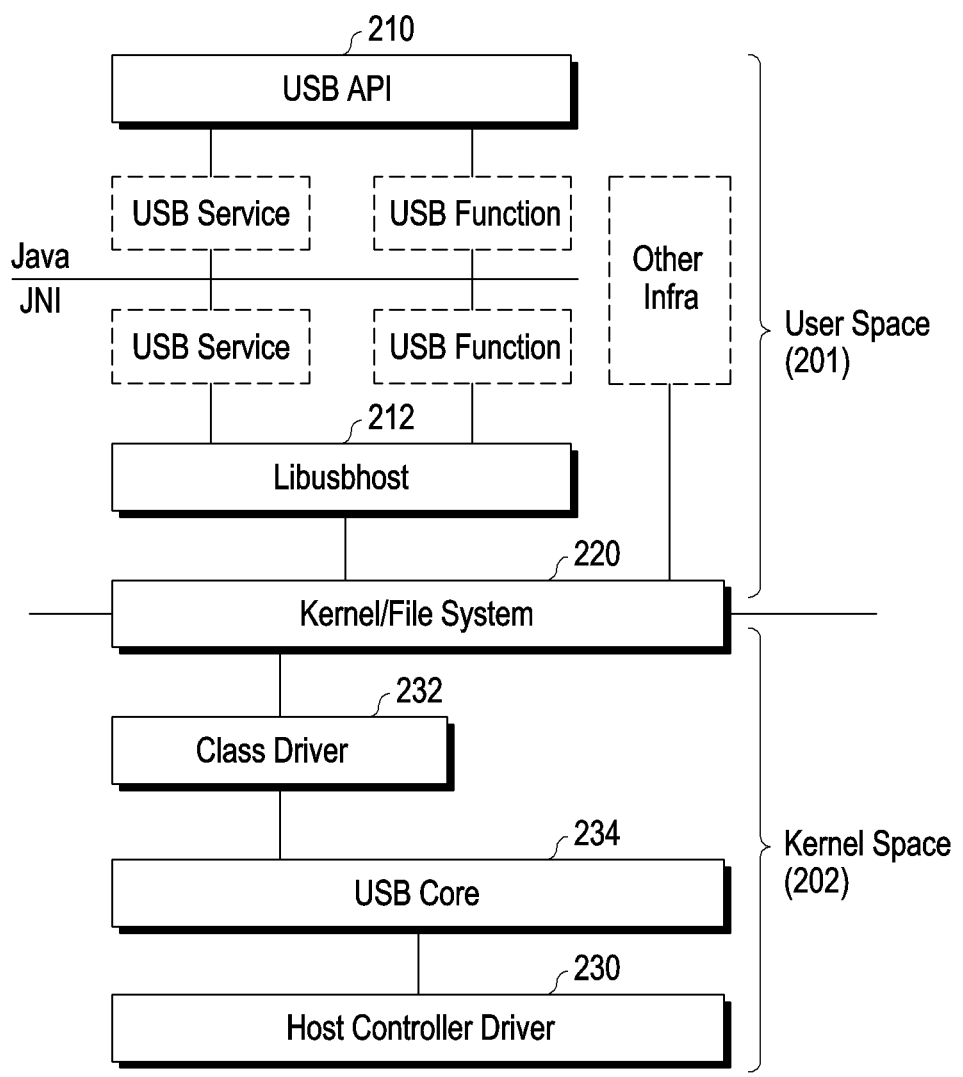
FIG. 2 is a block diagram illustrating a framework of a USB interface in the electronic device according to various embodiments.

FIG. 2 is a block diagram illustrating a framework of the USB interface in the electronic device according to various embodiments. The framework of the USB interface may be included in the middleware 144 and/or the operating system 142 that are included in the program 140 of FIG. 1.

Referring to FIG. 2, a USB API 210 and a libusbhost 212 may be included in a user space 201, and applications (not illustrated) of the user space 201 may use the framework of the USB interface through the USB API 210. For example, in the applications (not illustrated), at least one external device (e.g., an accessory) may be connected to the libusbhost 212 through a Java library or a Java native interface (JNI) library, and provide a USB service or a USB function. The libusbhost 212 may be connected to a kernel/file system 220. The user space 201 of the framework of the USB interface may further provide a USB host API (not illustrated) to an application.

A class driver 232, a USB core 234, or a host controller driver 230 may be included in a kernel space 202, and the user space 201 and the kernel space 202 may be connected through the kernel/file system 220. Further, another infra may be connected to the kernel/file system 220.

According to an embodiment, the external device (e.g., the accessory) may be connected to the kernel space 202 through the kernel/file system 220 in the user space 201. As described above, if the external device, for instance an accessory that can be connected to the electronic device 101 through the USB connector, namely a USB accessory is connected, the electronic device 101, for instance the host core 234, may activate the class driver 232 (e.g., the driver program) for using the USB accessory and may, for instance, load the class driver 232 on the memory 130.

Referring to FIG. 2, the external device (e.g., the accessory) connected to the electronic device 101 through the connection terminal 178 (e.g., the USB connector) may be recognized through the USB core 234. If the external device (e.g., the accessory) is physically connected to the connection terminal 178 of the electronic device 101, the USB core 234 may activate (load) the class driver 232. The USB core 234 may receive description information from the physically connected accessory. For example, the description information may include a USB class code of the external device connected to the connector 177. The USB core 234 may activate (load) the class driver 232 corresponding to the USB class code included in the description information.

According to an embodiment, when the external device (e.g., the accessory) is connected to the interface 177 (e.g., the USB interface) or the connection terminal 178 (e.g., the USB connector) of the electronic device 101, the USB class code may be transmitted from the external device (e.g., the USB interface or the USB connector of the external device) to the interface 177 (e.g., the USB interface) or the connection terminal 178 (e.g., the USB connector) of the electronic device 101. Referring to FIG. 2, the USB class code may be transmitted from the external device (e.g., the accessory) to the USB core 234 through the interface 177 or the connection terminal 178 of the electronic device 101.

According to an embodiment, the USB core 234 compares the USB class code of the external device with the USB class codes that are previously stored in the electronic device 101, and thereby can check a type of the external device (e.g., the accessory) or determine whether or not the external device is a device supported by the electronic device 101. Thereby, the external device (e.g., the accessory) may be recognized by the USB core 234.

According to an embodiment, a list of the USB class codes of the accessories supported by the electronic device 101 as in Table 1 below may be stored in the memory 130 of the electronic device 101.

TABLE 1

| USB class code | Descriptor usage | Description |
|---|---|---|
| 00h | Device | Use class information in the interface descriptors |
| 01h | Interface | Audio |
| 02h | Both | Communications and CDC control |
| 03h | Interface | Human interface device (HID) |
| 05h | Interface | Physical |
| 06h | Interface | Image |
| 07h | Interface | Printer |
| 08h | Interface | Mass storage |
| 09h | Device | Hub |
| 0Ah | Interface | CDC-data |
| 0Bh | Interface | Smart card |
| 0Dh | Interface | Content security |
| 0Eh | Interface | Video |
| 0Fh | Interface | Personal healthcare |
| 10h | Interface | Audio/Video devices |
| 11h | Device | Billboard device class |
| 12h | Interface | USB Type-C bridge class |
| DCh | Both | Diagnostic device |
| E0h | Interface | Wireless controller |
| EFh | Both | Miscellaneous |
| FEh | Interface | Application specific |
| FFh | Both | Vendor specific |

For example, in a case where the USB class code of the description information received from the external device (e.g., the accessory) is matched with any one of the USB class codes of Table 1, the USB core 234 may determine that the accessory is the device supported by the electronic device 101. The USB class code of Table 1 may represent a function of the device (the accessory) corresponding to the USB class code. Referring to Table 1, for example the devices (the accessories) whose USB class codes are 00h, 03h, 05h, 06h, 07h, 08h, 0Ah, 0Bh, 0Dh, 0Eh, 0Fh, 10h, 11h, 12h, E0h, and FEh may support an interface function. The devices (the accessories) whose USB class codes are 00h, 09h, and 11h may be recognized as devices separately from the electronic device 101, and be connected to the electronic device 101. The devices (the accessories) whose USB class codes are 02h, DCh, EFh, and FFh may support the interface function, and may be recognized as devices separately from the electronic device 101. For example, if the USB class code transmitted from the external device is 01h, the USB core 234 may determine that the external device is an interface device (e.g., a speaker) supporting an audio function.

According to an embodiment, the USB core 234 may activate (load) the class driver 232 corresponding to the USB class code. This process is referred to as a USB enumeration process for the external device (e.g., the accessory). That is, the USB enumeration process may indicate a series of processes of recognizing the external device (e.g., the accessory), activating the class driver 232 suitable for the recognized external device, and registering the external device with the electronic device 101 such that the external device of the electronic device can be controlled through the activated class driver 232. If the USB enumeration process is completed, a communication channel is formed between the electronic device 101 and the external device, and thus communication between the electronic device 101 and the external device is possible.

According to an embodiment, the host controller driver 230 may perform the USB enumeration process, and form the communication channel between the electronic device 101 and the external device using the class driver 232.

According to an embodiment, if the electronic device 101 is converted to the accessory limitation mode, the USB core 232 inactivates (terminates a function of or removes) the class driver 232 corresponding to each of the external devices (e.g., the accessories) connected to the electronic device 101 through the connection terminal 178, and thereby can terminate connection with each of the external devices.

According to an embodiment, the electronic device 101 may recognize the external device (e.g., the accessory) using the USB host API. The USB host API may gain access to the external devices connected to the electronic device 101 without being connected to the class driver 232. For example, in the case of the application such as a USB picture transfer protocol (PTP) camera, a separate class driver 232 (e.g., a separate driver program) may not be required. The USB core 234 may check device information about the external device requested in the application without activating (loading) the class driver 232, and drive the external device within the application. That is, the accessory connected to the electronic device 101 may be used through the USB host API without activating (loading) the driver program. In a case where the electronic device 101 is converted to the accessory limitation mode, the processor 120 or the USB core 234 inactivates (or interrupts) the USB host API, and thereby can control the electronic device 101 through the USB host API such that the electronic device 101 cannot gain access to the external device. That is, after the USB host API is inactivated, although the electronic device 101, for instance the application, uses (calls) the USB host API, the USB host API cannot perform any function.

According to an embodiment, the USB host API may support a plurality of functions. The USB core 234 interrupts some of the functions of the USB host API, and does not interrupt the other functions, and thereby the USB core 234 can limit an access to the external device (e.g., the accessory) via the USB host API in the accessory limitation mode. That is, the USB core 234 may maintain a state in which some of the various functions supported by the USB host API are activated in the accessory limitation mode, and inactivate the other functions. That is, after the USB host API is inactivated, when the electronic device 101, for instance the application, uses (calls) the USB host API, the USB host API can perform some of the functions, whereas the USB host API cannot perform the other functions.

Figure 3:
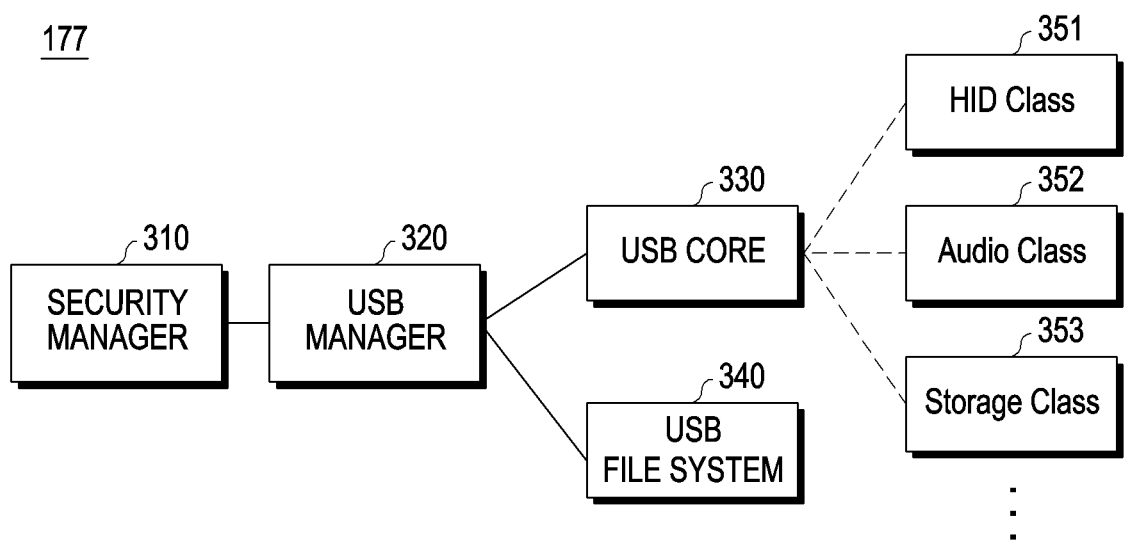
FIG. 3 is a block diagram illustrating a constitution of the USB interface in the electronic device according to various embodiments.

FIG. 3 is a block diagram illustrating a constitution of the USB interface in the electronic device according to various embodiments.

Referring to FIG. 3, the framework (e.g., the user space 201 of FIG. 2) of the USB interface of the electronic device (e.g., the electronic device 101) according to various embodiments may include a security manager 310 and/or a USB manager 320.

The security manager 310 may correspond to at least one of the USB API 210, USB service, USB function, or libusbhost 212 of FIG. 2, and perform at least one function that can be performed by these components.

The security manager 310 may change authority for an access to resources (e.g., specific application functions such as a memory, an accessory, a camera/recording function, etc.) that can be used by the electronic device 101. For example, when the electronic device 101 enters a state in which specific security is required (e.g., a mobile device management (MDM) mode or a kids mode) or comes out of the state, the security manager 310 may change authority for an access to functions (or resources) used by the electronic device 101. For example, the security manager 310 may cause the electronic device 101 to enter the accessory limitation mode or may release the accessory limitation mode of the electronic device 101.

The security manager 310 may communicate with the USB manager 320 (e.g., in a method of transmitting an event). The USB manager 320 may communicate with or control a USB core 330 and a USB file system 340 (that are located in the kernel space 202). The USB core 330 may control (e.g., activate or inactivate) class drivers (e.g., driver programs), for instance, an HID class 351, an audio class 352, a storage class 353, etc., that correspond to the USB class codes for operating the external devices (e.g., the accessories) connected to the electronic device 101 through the connection terminal 178 (e.g., the USB connector). The USB file system 340 may be used by the USB host API. The processor (e.g., the processor 120) may use the USB file system through the USB host API, thereby gaining access to the external devices (e.g., the accessories) connected to the electronic device 101.

According to an embodiment, if the electronic device 101 is converted to the accessory limitation mode, the security manager 310 may transmit the white list or the black list for executing the accessory limitation mode to the USB manager 320, and notify the USB manager 320 that the electronic device 101 is converted to the accessory limitation mode.

According to an embodiment, the USB manager 320 may transmit the white list and/or the black list activated (or loaded) by the security manager 310 to the USB core 330.

According to an embodiment, the USB core 330 may store and manage the white list or the black list received from the USB manager 320 in the memory 130.

According to an embodiment, if the USB core 330 receives the security mode, for instance the information relevant to the accessory limitation mode (e.g., the accessory limitation mode entry notice, the white list, and the black list) from the USB manager 320, the USB core 330 may stop (inactivate or unload) at least some of the class drivers 232 (e.g., the driver programs) that are activated at present.

According to an embodiment, in a USB enumeration process that performed if the external device (e.g., the USB device) is connected to the USB core 330, the USB core 330 may continue to proceed or stop the USB enumeration process on the basis of, for instance, the connection allowable device in which the white list or the black list is included. Thus, the electronic device (e.g., the security manager 310) may control connection of one or more external devices connected through the connection terminal 178.

According to an embodiment, if the security mode, for instance the accessory limitation mode, is executed, the USB manager 320 inactivates (or interrupts) the USB file system 340, and thereby the USB manager 320 can inactivate the USB host API. Thereby, the USB manager 320 may control the electronic device 101 such that the electronic device 101 does not access (or communicate with) the external device (e.g., the accessory) via the USB host API.

According to an embodiment, if the accessory limitation mode is executed, the USB core 330 inactivates (or removes) the class drivers 232 (e.g., the driver programs) that are equivalent to the USB class codes corresponding to external devices other than the external devices (e.g., the accessories) registered with the white list, and thereby the USB core 330 may control the electronic device 101 such that the electronic device 101 cannot gain access to the external devices through the class drivers. According to another embodiment, if the accessory limitation mode is executed, the USB core 330 inactivates (or removes) the class drivers for gaining access to the external devices registered with the black list, and thereby the USB core 330 may control the electronic device 101 such that the electronic device 101 cannot gain access to the accessories through the class drivers.

According to an embodiment, the USB manager 320 may be omitted. For example, the security manager 310 may also transmit notice information for notifying entry to the accessory limitation mode, the white list, or the black list to the USB core 330.

According to an embodiment, the USB manager 320 may further include a USB host API (not illustrated). When the application uses (calls) the USB host API of the USB manager 320, the USB host API can perform some of the functions, whereas the USB host API cannot perform the other functions.

Figure 4:
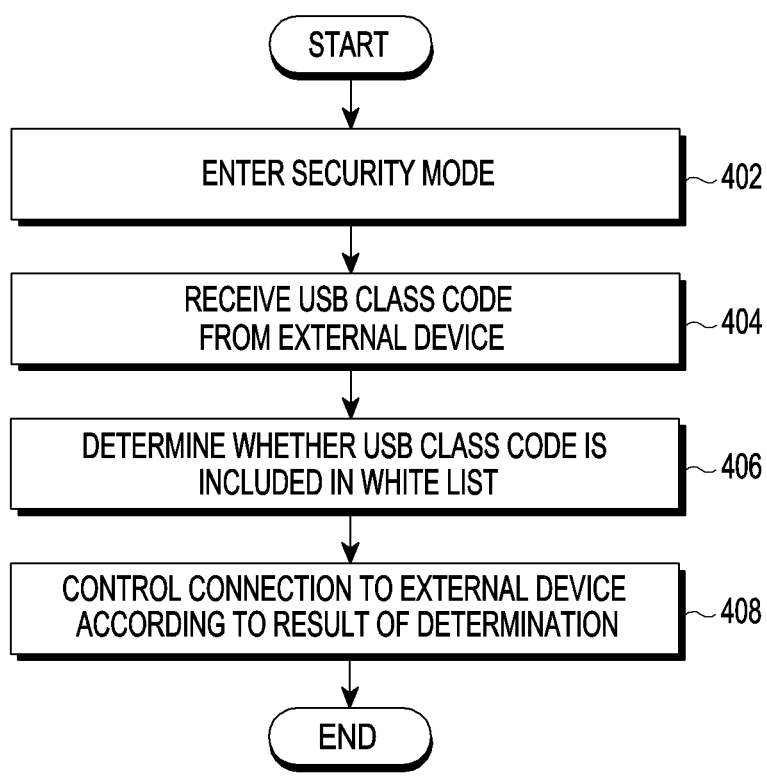
FIG. 4 is a flow chart illustrating a method of operating the electronic device according to various embodiments.

FIG. 4 is a flow chart illustrating a method of operating the electronic device according to various embodiments.

Referring to FIG. 4, in operation 402, the processor (120) of the electronic device 101 may enter a security mode (e.g., an accessory limitation mode).

In the security mode, in operation 404, the processor 120 may receive a USB class code corresponding to the external device from the external device (e.g., the accessory) connected to the USB interface of the electronic device 101. According to an embodiment, the USB class code may be included in description information transmitted from the external device to the electronic device 101.

In operation 406, the processor 120 may determine whether the USB class code received from the external device is included in a white list of connection allowable devices connected to the electronic device 101 in the security mode.

In operation 408, the processor 120 may control communication connection between the external device and the electronic device 101 according to whether or not the USB class code is included in the white list. According to an embodiment, in operation 408, if the USB class code of the external device is included in the white list, the processor 120 or the USB core 330 may activate a class driver (e.g., a driver program) corresponding to the USB class code. Thereby, the electronic device 101 may gain access to the external device.

According to an embodiment, in operation 408, if the USB class code of the external device is not included in the white list, the processor 120 or the USB core 330 may not activate a class driver (e.g., a driver program) corresponding to the USB class code. Thereby, the electronic device 101 may not gain access to the external device.

A method of operating the electronic device according to an embodiment of the disclosure includes: entering a security mode; receiving a USB class code corresponding to an external device from the external device connected through a USB interface of the electronic device in the security mode; determining whether the USB class code is included in a white list of connection allowable devices that are connectable to the electronic device in the security mode; and controlling communication connection between the external device and the electronic device according to whether or not the USB class code is included in the white list.

Figure 5:
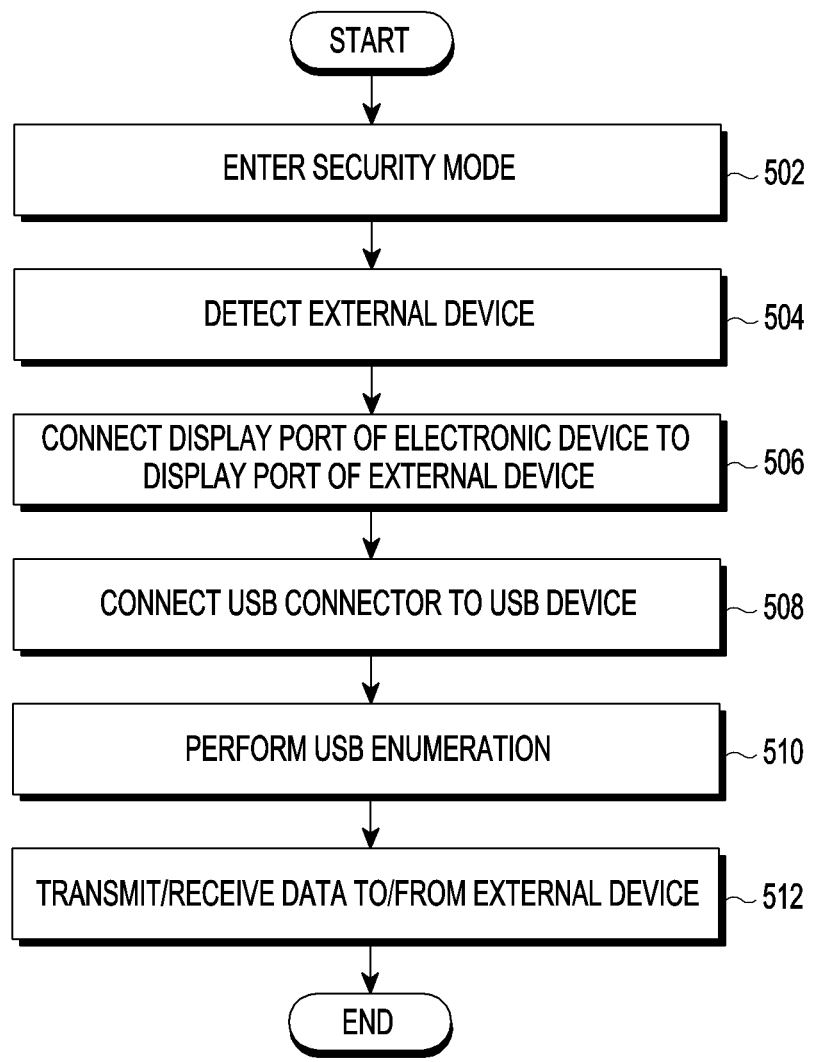
FIG. 5 is a flow chart illustrating a method of operating the electronic device according to various embodiments.

FIG. 5 is a flow chart illustrating a method of operating the electronic device according to various embodiments. In FIG. 5, it is assumed that the electronic device 101 is connected to the external device (e.g., the accessory) through the USB connector using a first data path or a second data path.

According to an embodiment, the first data path may be a terminal connected to Tx/Rx of a connector in Tx/Rx terminals of a display interface of the electronic device. According to an embodiment, the second data path may be a terminal connected to a D terminal of the connector in a D terminal of a USB port of the electronic device.

Referring to FIG. 5, in operation 502, the electronic device 101 may enter a security mode (e.g., an accessory limitation mode). In the security mode, the electronic device 101 allows the external devices (e.g., the accessories) of a selected type to gain access to the electronic device through the USB connector. The external devices of the selected type may be determined on the basis of a list (e.g., a white list) of the external devices or the USB class codes that are allowable in the security mode. According to an embodiment, if the electronic device 101 enters the security mode, the processor 120 or the USB core 330 may terminate connection to the external devices that is previously connected before process 502.

In operation 504, the electronic device 101 may detect that the external device including the display and the USB device is connected to the USB connector of the electronic device 101. For example, a processor 120 or 611 and/or a CC IC 614 of the electronic device may sense the external device including the display and the USB device.

In operation 506, the electronic device 101 may connect a display port of the electronic device to a display port of the external device through the first data path while USB data signals are not transmitted through the first data path.

For example, the USB core 330 and/or the host controller driver 230 of the electronic device 101 may block data communication on a path connected from a USB port to a connector inside the electronic device 101, and connect the display port inside the electronic device 101 to the display port of the external device. According to an embodiment, in operation 506, the USB data signals may not be transmitted from the electronic device 101 through the first data path of the USB connector. According to an embodiment, in operation 506, the processor 120 maintain impedance of the USB port, which transmits the USB data signals through the first data path, in a high state, and thereby may control the electronic device 101 such that the USB data signals are not transmitted/received.

In operation 508, the electronic device 101 may connect the USB connector to the USB device of the external device for data transmission/reception. For example, the USB core 330 of the electronic device 101 may connect the USB connector to the USB device of the external device for the data transmission/reception. According to an embodiment, the USB device may be a device different from the display.

In operation 510, the electronic device 101 may perform a USB enumeration process with the external device using the list. For example, the USB core 330 of the electronic device 101 may perform the USB enumeration process on the USB device or the display on the basis of the list (e.g., the white list) of the external devices or the UB class codes that are allowable in the security mode. Thereby, the USB device may communicate with the electronic device 101.

In operation 512, the electronic device 101 may transmit/receive data to/from the external device in which the USB enumeration process is completed through the second data path.

Figure 6:
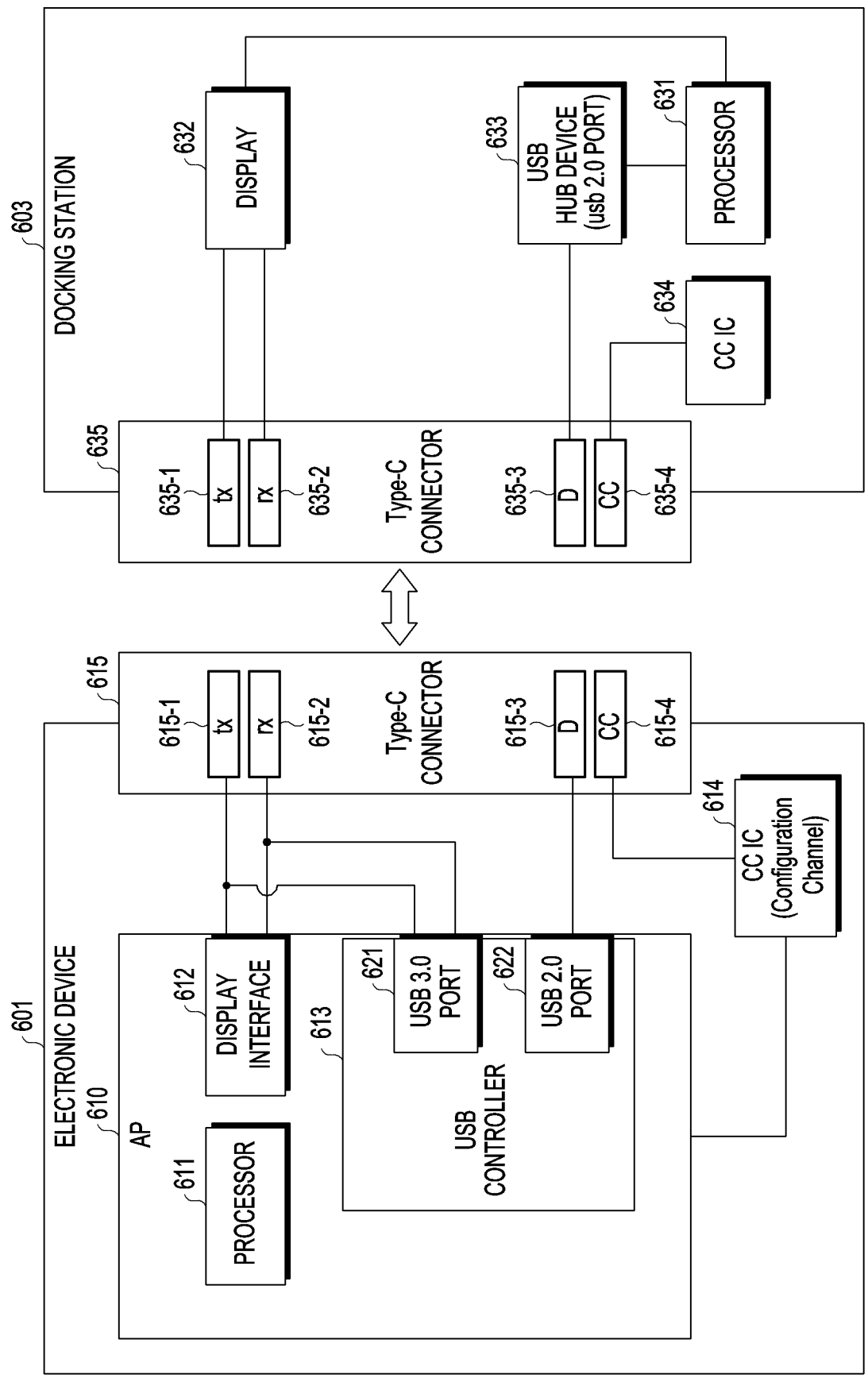
FIG. 6 is a block diagram illustrating the electronic device according to various embodiments, and a docking station that can be connected to the electronic device.

FIG. 6 is a block diagram illustrating the electronic device according to various embodiments, and a docking station that can be connected to the electronic device.

Referring to FIG. 6, an electronic device 601 may include an application processor (AP) 610, a configuration channel (CC) IC 614, or a Type-C connector 615.

The AP 610 may include a processor 611, display interface hardware 612, and a USB controller 613, and the USB controller 613 may include a USB 3.0 port 621 for superspeed communication and a USB 2.0 port 622 for non-superspeed communication.

The processor 611 of the AP 610 may drive software for controlling the electronic device 601. The processor 611 may drive, for instance, USB software, display port software, CC IC driver software, and so on.

The display interface 612 may be, for instance, an image interface such as DisplayPort, high-definition multimedia interface (HDMI), mobile high-definition link (MHL), or the like. The display interface 612 may be connected to Tx/Rx terminals 615-1 and 615-2 of the Type-C connector 615 (through display ports (not illustrated) included inside the display interface 612). The Tx/Rx terminals 615-1 and 615-2 of the Type-C connector 615 may be connected to Tx/Rx terminals 635-1 and 635-2 of a Type-C connector 635 included in a docking station 603. Since the Tx/Rx terminals 635-1 and 635-2 of the Type-C connector 635 are connected to a display 632 of the docking station, for instance the display interface such as DisplayPort, HDMI, MHL, or the like, the display interface 612 of the electronic device 601 may transmit image data to the docking station 603 through the Type-C connector 615 of the electronic device 601 and the Type-C connector 635 of the docking station 603.

The USB controller 613 may control an operation of the USB 3.0 port 621 or the USB 2.0 port 622. The USB 3.0 port 621 may be connected to the Tx/Rx terminals 615-1 and 615-2 of the Type-C connector 615. The USB 2.0 port 622 may be connected to a D terminal 615-3 of the Type-C connector 615. The D terminal 615-3 may be connected to a D terminal 635-3 of the Type-C connector 635 included in the docking station 603, and the D terminal 635-3 may be connected to a USB hub device 633 (e.g., a USB 2.0 port). Thereby, USB data signals of the electronic device 601 may be transmitted to the USB hub device 633 of the docking station 603 through the USB. 2.0 port 622.

For example, when the electronic device 601 and the docking station 603 perform communication, the CC IC 614 connected to the AP 610 may constitute a channel for the communication. The CC IC 614 may be connected to a CC terminal 615-4 of the Type-C connector 615, and the CC terminal 615-4 may be connected to a CC terminal 635-4 of the Type-C connector 635 included in the docking station 603. The CC terminal 635-4 may be connected to a processor 631 of the docking station 603.

The docking station 603 may include the processor 631, the display 632, the USB hub device 633, a CC IC 634, or the Type C connector 635. The processor 631 may control overall operations of the docking station 603. The display 632 may receive the image data from the electronic device 601 through the connected Type-C connector 635. The USB hub device 633 may receive USB data from the electronic device 601 through the connected Type-C connector 635. According to an embodiment, the USB hub device 633 may include a USB 2.0 port.

According to an embodiment, a signal line connected to the display interface 612 of the AP 610 and a signal line connected to the USB 3.0 port 621 of the AP 610 may be connected to the Tx/Rx terminals 615-1 and 615-2 of the Type-C connector 615. The Tx/Rx terminals 615-1 and 615-2 may be, for instance, data paths for performing superspeed communication with the docking station 603. According to an embodiment, the electronic device 101 may basically maintain a state (a short) in which Tx/Rx terminals of the USB 3.0 port 621 set an electric current to flow to the Tx/Rx terminals 615-1 and 615-2 of the connector 615.

The AP 610 should control the USB controller 613 such that high resistance (or high impedance) is applied to the USB 3.0 port 621 to allow ports (not illustrated) of the display interface 612 of the AP 610 to use the Tx/Rx terminals 615-1 and 615-2 of the connector 615. As described above, if the high resistance is applied and no electric current flows to the USB 3.0 port 621, an effect that the USB 3.0 port 621 is open can occur. If the USB 3.0 port 621 is open, an electric current can flow to the ports of the display interface 612.

Meanwhile, if a security mode (e.g., an accessory limitation mode) such as an MDM policy is applied to the electronic device (e.g., the AP 610), the USB controller 613 may be inactivated, and the AP 610 may not control the USB controller 613. That is, since the USB 3.0 port 621 cannot be open, the display interface 621 of the AP 610 can transmit no signals to the Tx/Rx terminals 615-1 and 615-2 of the Type-C connector 615. The above description has be made using terms of the Type-C connector standard, but the names may be changed according to a type of the connector. For example, the Rx and Tx terminals in the disclosure may be generalized as terminals for superspeed communication, and the D terminal may be generalized as a terminal for low-speed communication. The CC terminal may be generalized as an identification (ID) or detection terminal. The CC IC may be named a detection module of the external electronic device.

Figure 7:
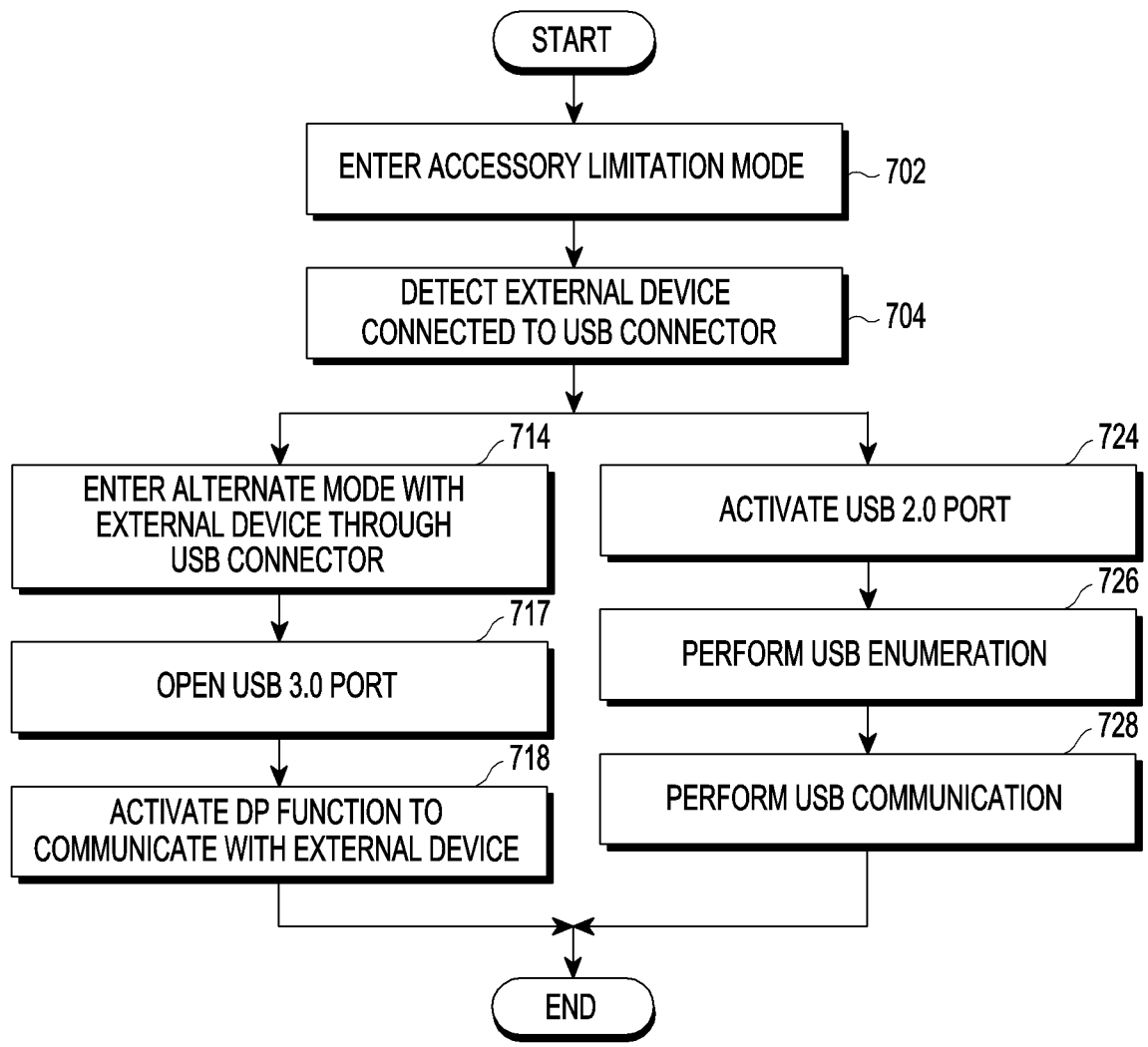
FIG. 7 is a flow chart illustrating a method of operating the electronic device according to various embodiments.

FIG. 7 is a flow chart illustrating a method of operating the electronic device according to various embodiments.

Referring to FIG. 7, in operation 702, the electronic device 601 (e.g., the electronic device 101 of FIG. 1) may enter a security mode, for instance an accessory limitation mode. The accessory limitation mode may be a mode for executing an MDM policy or a kids mode. In operation 702, the security manager 310 may transmit a white list or a black list to the USB core 330.

In operation 704, the CC IC 614 of the electronic device 101 may sense the external device (e.g., the accessory) connected to the connector, for instance the USB connector. The external device sensed in operation 704 may be, for instance, an alternate device (e.g., a display) or a USB device as a device that is connected to the electronic device 101 through the USB Type-C connector. The electronic device 601 reads information of the external device (e.g., the docking station 603) through the previously provided channel configuration (CC) recognition terminal (e.g., the CC terminal 615-4) or the CC IC 614, and thereby may identify the external device. The display is a device for outputting an image, and may be a display of a high definition multimedia interface (HDMI), a display port (DisplayPort), a mobile high-definition link (MHL), or the like. The USB device may be a USB host device or a USB slave device as a device that can be connected to the electronic device 101 through the USB interface.

In operation 714, the electronic device may enter an alternate mode with the external device through the USB connector. In operation 716, the processor 120 may open the USB 3.0 port 621. For example, the processor 120 may apply high impedance to the USB 3.0 port 621, and prevent an electric current from flowing to the USB 3.0 port 621. In operation 718, the processor 120 may activate a display port function (e.g., a DisplayPort function), and communicate with the external device.

According to an embodiment, the electronic device 601 (e.g., the CC IC) may communicate with the external device (e.g., the docking station 603) through the CC terminal 615-4, and enter the alternate mode. The electronic device (e.g., the processor 611) may receive information in which the external electronic device includes the display 632 from the CC IC 614, and thus set the display port to be able to use the Tx/Rx terminals 615-1 and 615-2 of the USB connector (e.g., the Type-C connector 615). For example, the processor 120 (e.g., the host controller driver 230) may control the electronic device 601 such that high impedance is applied to the USB 3.0 port 621.

According to an embodiment, the processor 611 of the AP 610 may activate the display port function (e.g., hardware or software), and perform display port communication with the external device connected to the electronic device 601.

Further, it is illustrated in FIG. 6 that the display interface 612 and the USB controller 613 are included in the AP chip, but the two modules may be composed of separate chips outside the AP chip.

Referring to FIG. 7, the USB controller 613 of the AP 610 may detect that the external device, particularly the USB device is connected. In operation 724, the processor 120 (e.g., the processor 611) of the electronic device 101 may activate the USB port 2.0 622. In operation 726, the electronic device 101 may perform a USB enumeration process. The USB core 330 and the USB controller 613 may start the USB enumeration process for the USB device to read out description information of the USB device. In this case, the USB core 330 may determine, on the basis of the white list received in operation 702, whether the USB device is a device corresponding to a USB class code that can be connected to the electronic device 601 or a device corresponding to a USB class code that cannot be connected to the electronic device 601.

If the USB enumeration process is completed, the electronic device 101 may perform USB communication via the USB 2.0 port 622 in operation 728. As a result of operation 726, if the USB device is the device corresponding to the USB class code that can be connected to the electronic device 601, a class driver corresponding to the USB class code is loaded, and thereby the USB Enumeration process can be terminated.

Operations 714 to 718 and operations 724 to 728 may be performed in parallel at the same time.

Figure 8:
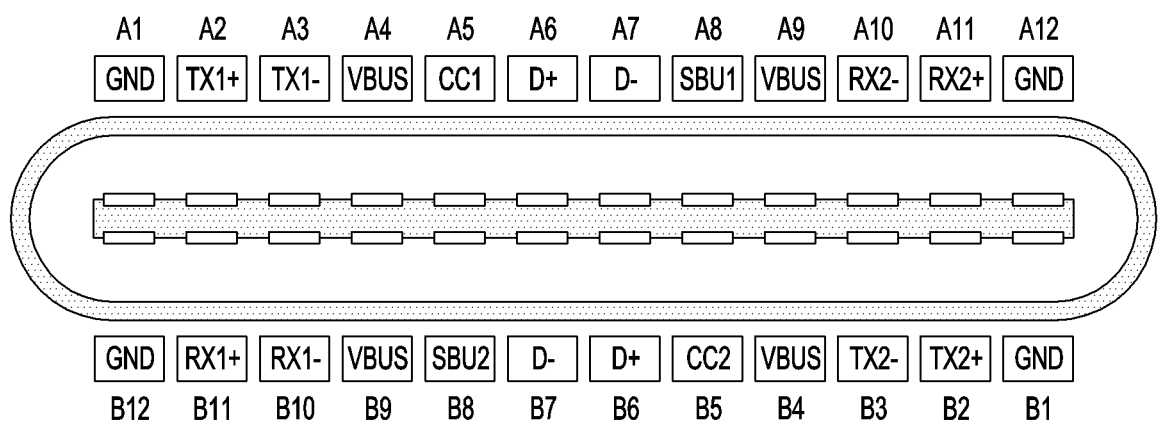
FIG. 8 is a view illustrating a structure of a USB connector of the electronic device according to various embodiments.

FIG. 8 is a view illustrating a structure of the USB connector of the electronic device according to various embodiments. The USB connector may be the Type-C connector 615 or 635 as illustrated in FIG. 6. In FIG. 8, it is assumed that the Type-C connector 615 of the electronic device 601 of FIG. 6 and the Type-C connector 635 of the docking station 603 are connected to each other.

The Type-C connector 615 of the electronic device 601 of FIG. 6 and the Type-C connector 635 of the docking station 603 may include a plurality of pins. Referring to FIG. 8, the USB connector 615 of the electronic device 601 may include, as the pins, a ground (GND) A1, TX1+ A2 and TX1− A3 for data transmission, VBUS A4 for power supply, CC1 A5 for channel constitution, D+ A6 and D− A7 for data transmission/reception (e.g., superspeed communication), SBU1 A8 for using a side band, VBUS A9 for power supply, RX2− A10 and RX2+ A11 for data reception, and a ground (GND) A12.

Likewise, the Type-C connector 635 of the docking station 603 may include, as the pins, a ground (GND) B12, RX1+ B11 and RX1− B10 for data reception, VBUS B9 for power supply, SBU2 B8 for using a side band, D− B7 and D+ B6 for data transmission/reception (e.g., superspeed communication), CC2 B5 for channel constitution, VBUS B4 for power supply, TX2− B3 and TX2+ B2 for data transmission, and a ground (GND) B1.

Referring to FIG. 6, the ground A1 of the Type-C connector 615 of the electronic device 601 may be connected to the ground B12 of the Type-C connector 635 of the docking station 603. Likewise, the ground A12 of the electronic device 601 may be connected to the ground B1 of the docking station 603.

The TX+ A2 of the electronic device 601 may be connected to the RX+ B11 of the docking station 603, and the TX− A3 may be connected to the RX− B10. Thereby, data may be transmitted from the electronic device 601 to the docking station 603. The VBUS A4 and VBUS A9 of the electronic device may be connected to the VBUS B9 and VBUS B4 of the docking station 603. Thereby, the docking station 603 may receive power from the electronic device 601.

The CC1 A5 of the electronic device 601 may be connected to the SBU2 B8 of the docking station 603, and the SBU1 A8 of the electronic device 601 may be connected to the CC2 B5 of the docking station 603. Thereby, channels may be formed between the electronic device 601 and the docking station 603 that communicate with each other using a side band.

The D+ A6 of the electronic device 601 may be connected to the D− B7 of the docking station 603, and the D− A7 of the electronic device 601 may be connected to the D+ of the docking station 603. Thereby, the electronic device 601 and the docking station 603 may perform superspeed data communication.

Figure 9:
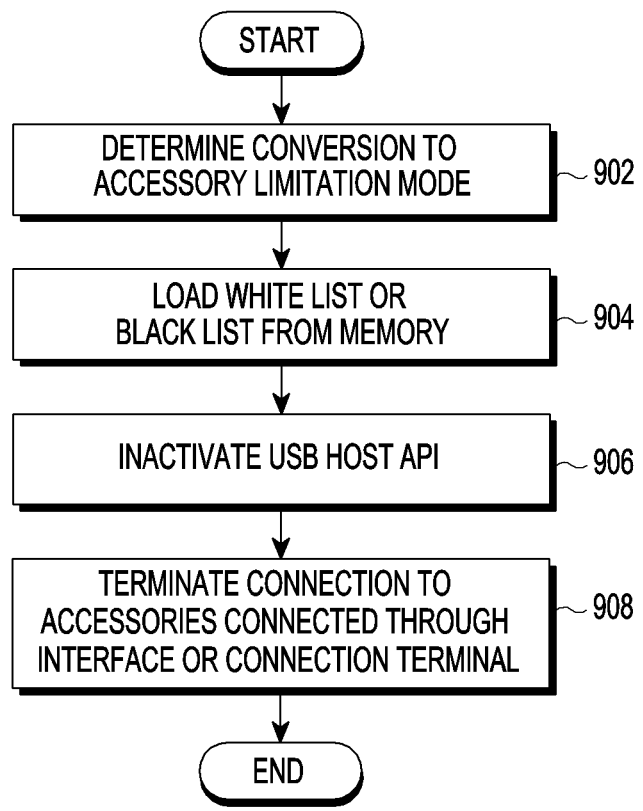
FIG. 9 is a flow chart illustrating a method of operating the electronic device according to various embodiments.

FIG. 9 is a flow chart illustrating a method of operating the electronic device 101 according to various embodiments. In FIG. 9, it is assumed that an external device in which connection to the electronic device 101 is controlled by the electronic device 101 is an accessory. The external device may be, for instance, an audio input/output device such as a keyboard, a mouse, a tablet, a microphone, a speaker, or a headset, a monitor, a head mounted display (HMD), a docking station, a printer, or a camera as an accessory that can be connected to the electronic device 101.

Referring to FIG. 9, in operation 902, the processor 120 may determine that an operation mode of the electronic device 101 is converted to an accessory limitation mode. According to an embodiment, if input of a user or pre-stored conversion conditions are satisfied, the electronic device 101 may be converted to the accessory limitation mode. The conversion conditions may be satisfied, for instance, in a case where the input of a user for converting to the accessory limitation mode is input into the electronic device 101 from the user, in a case where a current time is a preset time (e.g., PM 11:00), in a case where the electronic device 101 is located in a preset place (e.g., a company), or in a case where it is detected that a second user (e.g., a child, a student, etc.), to whom the use of the electronic device 101 or the external device (e.g., the accessory) connected to the electronic device 101 is limited by a first user (e.g., a parent, a teacher, etc.), gains access to the electronic device 101 or the external device. According to an embodiment, the conversion conditions may be preset inside the electronic device 101 or be received from the outside (e.g., the electronic devices 102 and 104, or the server 108).

If the operation mode of the electronic device 101 is converted to the accessory limitation mode, the processor 120 may apply a policy for limiting the use of the accessory (e.g., the electronic device 102) to the electronic device 101. For example, the processor 120 may apply a policy used in an MDM mode or a policy used in a kids mode to the electronic device 101.

In operation 904, the processor 120 may load (or read) a white list and/or a black list from the memory 130. The white list or the black list may be preset by a user or be received from the other electronic device 104 or the server 108 connected through the network 199. The white list may be a list that shows accessories useable in the accessory limitation mode, and the black list may be a list that shows accessories unusable in the accessory limitation mode. For example, the security manager 310 may load the white (or black) list stored in the memory, and transmit it to the USB core 330 through the USB manager 320.

In operation 906, the processor 120 may inactivate the USB host API. In the case where the USB host API is activated, the electronic device 101 may gain access to accessories connected to the electronic device 101 through the connection terminal 178 of the electronic device 101, for instance the USB connector, using the USB host API regardless of whether or not to apply the policy for limiting the use of the accessories applied to the electronic device 101. If the USB host API is activated even in a state in which the policy for limiting the use of the accessories is executed in the electronic device 101 in advance, an effect of executing the policy for limiting the use of the accessories cannot be exhibited, and thus the processor 120 may interrupt the USB host API when may be interrupted upon applying the policy for limiting the use of the accessories for the purpose of correct execution of the policy for limiting the use of the accessories. According to various embodiments, operation 906 may be omitted.

In operation 908, the processor 120 may terminate connection to the accessories connected to the electronic device 101 through the interface 177 (e.g., the USB interface) or the connection terminal 178 (e.g., the USB connector). According to an embodiment, in operation 908, the processor 120 may inactivate (or remove) the driver programs that are activated (or loaded) by the USB core 330 in order to use the accessories physically connected to the connection terminal 178, for instance the USB connector. According to an embodiment, in process 908, the processor 120 may inactivate (or remove) the driver programs corresponding to the accessories and removes the channels formed between the accessories and the electronic device 101, and thereby connection between the electronic device 101 and the accessories may be terminated.

According to an embodiment, operations 906 and 908 may be performed at the same time. That is, the electronic device 101 may interrupt the USB host API, terminate the connection to all the accessories that are connected through the connection terminal 178, and inactivate the driver programs that are activated (or loaded) by the USB core 330.

Figure 10:
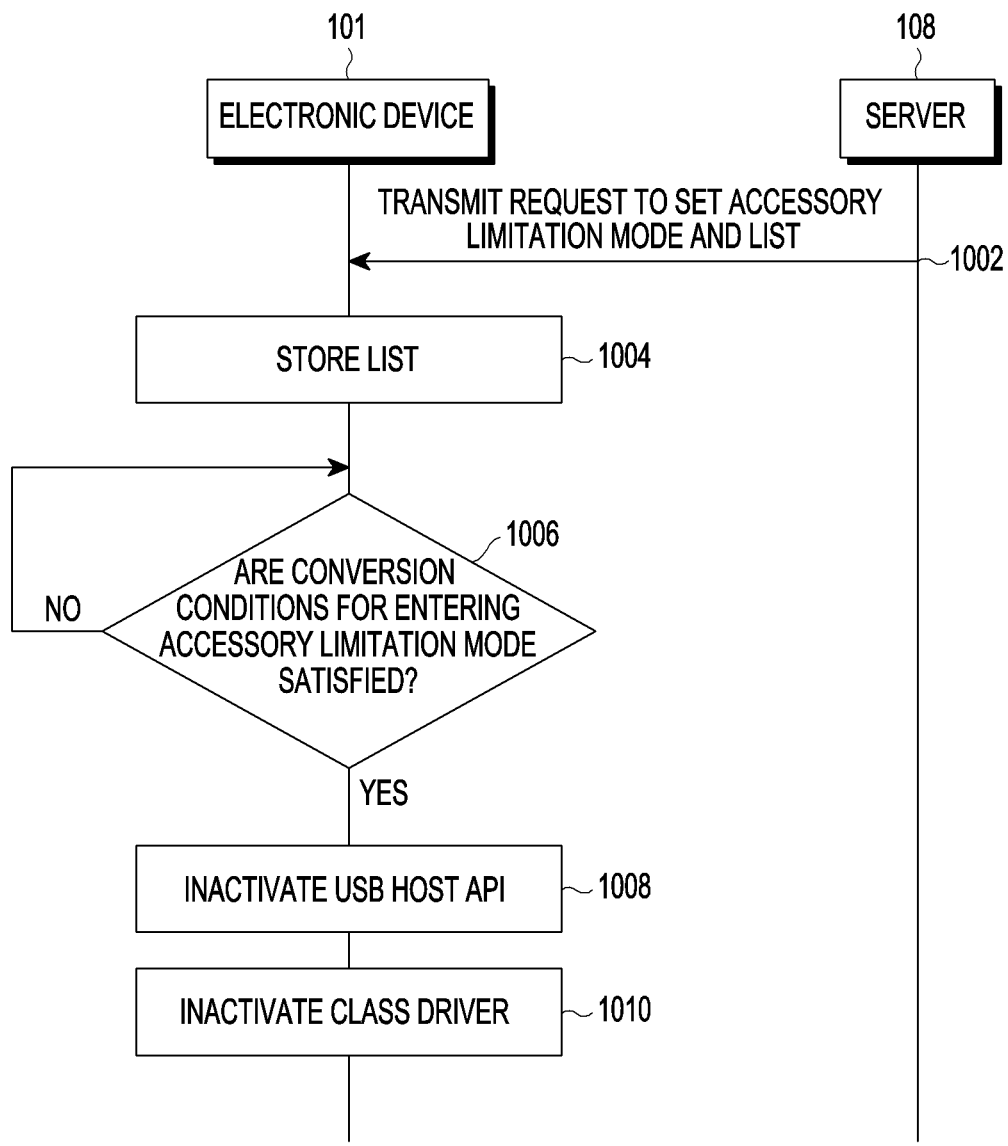
FIG. 10 is a flow chart illustrating a method of operating the electronic device according to various embodiments.

FIG. 10 is a flow chart illustrating a method of operating the electronic device according to various embodiments. In FIG. 10, it is assumed that the electronic device 101 sets a security mode, for instance an accessory limitation mode, at a request received from the server 108.

Referring to FIG. 10, in operation 1002, the electronic device 101 may receive a request to set the accessory limitation mode and/or a list for the accessory limitation mode from the server 108. According to an embodiment, in operation 1002, the server 108 may transmit a white list or a black list for the accessory limitation mode to the electronic device 101. In operation 1004, the electronic device 101 may store the list received from the server 108 in the memory 130. According to an embodiment, in operation 1002, the electronic device 101 may receive information about conversion conditions for converting to the accessory limitation mode from the server 108 along with the white list or the black list.

In operation 1006, the processor 120 may determine whether or not to satisfy the conversion conditions on which the electronic device 101 enters the accessory limitation mode. As a result of operation 1006, in a case where the electronic device 101 does not satisfy the conversion conditions (No in operation 1006), the processor 120 may control the electronic device 101 to maintain a current state until the electronic device 101 satisfies the conversion conditions. According to an embodiment, in processor 120, the electronic device 101 may monitor the current state, and determine, on the basis of the monitored result, whether or not the electronic device 101 satisfies the conversion conditions.

As a result of the determination of operation 1006, if the electronic device 101 satisfies the conversion conditions (Yes in operation 1006), the processor 120 may inactivate the USB host API in operation 1008. In operation 1010, the processor 120 may inactivate the class drivers (e.g., the driver programs) that have been activated (or loaded) by the USB core 330. Thereby, the electronic device 101 may terminate the connection to the accessories that have been connected to the electronic device 101.

Figure 11:
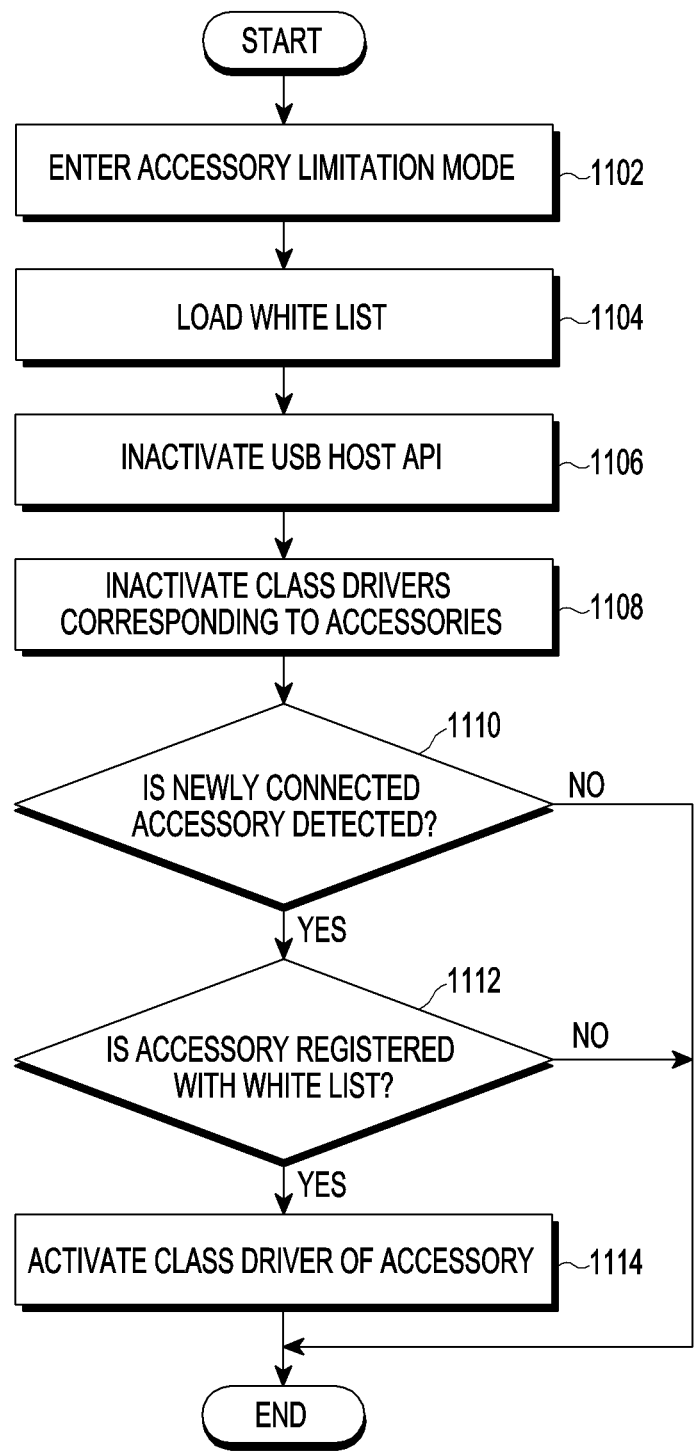
FIG. 11 is a flow chart illustrating a method of operating the electronic device according to various embodiments.

FIG. 11 is a flow chart illustrating a method of operating the electronic device according to various embodiments. In FIG. 11, it is assumed that an external device in which connection to the electronic device 101 in a security mode, for instance an accessory limitation mode, is limited is an accessory.

Referring to FIG. 11, in operation 1102, the electronic device 101 may enter the accessory limitation mode. In operation 1104, the processor 120 may activate (or load) a white list for accessories that can be used in the accessory limitation mode. For example, the security manager 310 may load the white list stored in the memory 130, and transmit the loaded white list to the USB core 330 through the USB manager 320.

In operation 1106, the processor 120 may inactivate the USB host API. In operation 1108, the processor 120 may inactivate (or interrupt) class drivers corresponding to the accessories (e.g., the electronic devices 102) that are connected to the electronic device 101 through the interface 177 (e.g., the USB interface) or the connection terminal 178 (e.g., the USB connector). The processor 120 may remove communication channels formed between the electronic device 101 and the accessories via operations 1106 and 1108. In various embodiments, operation 1106 may not be performed.

In operation 1110, the processor 120 may determine whether or not an accessory that is newly connected to the electronic device 101 through the interface 177 or the connection terminal 178 is detected. As a result of the determination of operation 1110, in a case where the newly connected accessory is not detected (No in operation 1110), the processor 120 may control the electronic device 101 to maintain a current state. According to an embodiment, the processor 120 may continuously monitor whether a new accessory is connected to the electronic device 101. According to an embodiment, in a case where the new accessory is connected to the connector of the electronic device 101, the processor 120 may receive interrupt corresponding thereto, and determine that the new accessory is connected. According to an embodiment, after operation 1108, if a USB class code of the accessory or description information including the USB class code is transmitted through the interface 177 or the connection terminal 178, the processor 120 may determine that the new accessory is connected to the electronic device 101.

As a result of the determination of operation 1110, in a case where the newly connected accessory is detected (Yes in operation 1110), the processor 120 may determine, in operation 1112, whether or not the accessory is registered with a white list. As a result of the determination of operation 1112, in a case where the accessory is not registered with the white list (No in operation 1112), the processor 120 may control the electronic device 101 to maintain a current state. According to an embodiment, the processor 120 may determine, in operation 1112, whether or not the USB class code received from the newly connected accessory is included in those of the accessories registered with the white list. As a result of the determination of operation 1112, in a case where the USB class code received from the accessory is not the USB class code included in the white list, the processor 120 may determine that the accessory is not registered with the white list. In the case where the newly connected accessory is not registered with the white list, the processor 120 does not perform an enumeration process on the accessory, and thereby the electronic device 101 cannot gain access to the accessory. According to an embodiment, as a result of the determination of operation 1112, in the case where the accessory is not registered with the white list (No in operation 1112), the processor 120 may display relevant UX (e.g., a pop-up and/or a message, for instance a message like "The USB Camera is not supported at present according to the MDM security policy.") through the display (e.g., the display unit 160) of the electronic device 101.

As a result of the determination of operation 1112, in a case where the newly connected accessory is registered with the white list (Yes in operation 1112), the processor 120 activates (or loads) a class driver (e.g., a driver program) of the accessory in operation 1114 and performs an enumeration process on the accessory, and thereby a communication channel between the electronic device 101 and the accessory can be generated. As a result, the electronic device 101 can gain access to the accessory registered with the white list, and use the accessory. As a result of the determination of operation 1112, in a case where the USB class code of the accessory is the USB class code included in the white list, the processor 120 may determine the accessory to be a device that can be used in the accessory limitation mode. In operation 1114, the processor 120 may activate the class driver corresponding to the USB class code of the accessory.

According to an embodiment, if a pre-stored time (e.g., one minute) has been elapsed after the execution of operation 1108, the processor 120 checks the USB class codes that are transmitted again from one or more accessories connected through the interface 177 or the connection terminal 178, and thereby may perform a new recognition process on the accessories. The processor 120 may determine whether or not the accessory is a device registered with the white list, on the basis of the USB class codes that are transmitted again from the accessories after process 1108. In a case where the accessory is registered with the white list, the processor 120 may activate (or load) the class driver corresponding to the USB class code of the accessory in operation 1114, and generate a communication channel between the electronic device 101 and the accessory. Thereby, the electronic device 101 can gain access to the accessory, and use the accessory.

Figure 12:
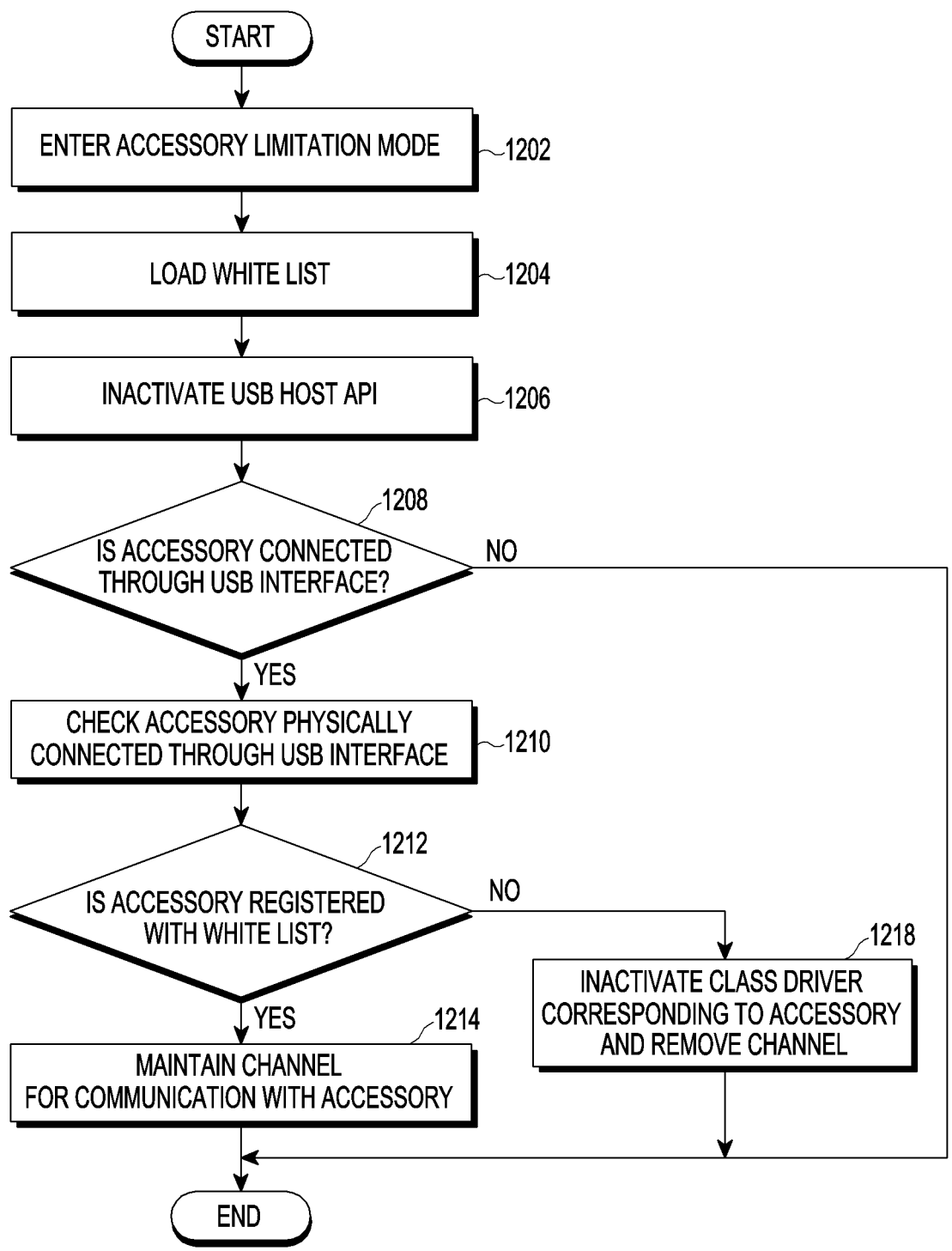
FIG. 12 is a flow chart illustrating a method of operating the electronic device according to various embodiments.

FIG. 12 is a flow chart illustrating a method of operating the electronic device according to various embodiments. In FIG. 12, it is assumed that an external device in which connection to the electronic device 101 in a security mode, for instance an accessory limitation mode, is limited is an accessory.

Referring to FIG. 12, in operation 1202, the electronic device 101 may enter the accessory limitation mode. In operation 1204, the processor 120 may activate (or load) a white list. In operation 1206, the processor 120 may inactivate the USB host API.

In operation 1208, the processor 120 may determine whether or not an accessory is connected through the interface 177 (e.g., the USB interface) or the connection terminal 178 (e.g., the USB connector). As a result of the determination of operation 1208, in a case where the accessory is not connected (No in operation 1208), the processor 120 may maintain a current state.

As a result of the determination of operation 1208, in a case where the accessory is connected (Yes in operation 1208), the processor 120 may check the accessory connected through the interface 177 or the connection terminal 178 in operation 1210. According to various embodiments, the operation 1208 may not be performed. The processor 120 may check a program under execution at present, and check the accessory connected to the connector at present.

In operation 1212, the processor 120 may determine whether or not the accessory connected through the interface 177 or the connection terminal 178 is registered with the white list. As a result of the determination of operation 1212, in a case where the accessory connected through the interface 177 or the connection terminal 178 is not registered with the white list (No in operation 1212), the processor 120 may inactivate (or remove) a class driver corresponding to the accessory in operation 1218, and remove a communication channel between the electronic device 101 and the accessory. As described above, the processor 120 may terminate the connection to the accessory that is not registered with the white list.

As a result of the determination of operation 1212, in a case where the accessory connected through the interface 177 or the connection terminal 178 is registered with the white list (Yes in operation 1212), the processor 120 may control the electronic device 101 to maintain the communication channel between the electronic device 101 and the accessory. According to an embodiment, the processor 120 may control the electronic device 101 to be able to maintain a state in which a class driver for using the accessory is activated (or loaded).

Figure 13:
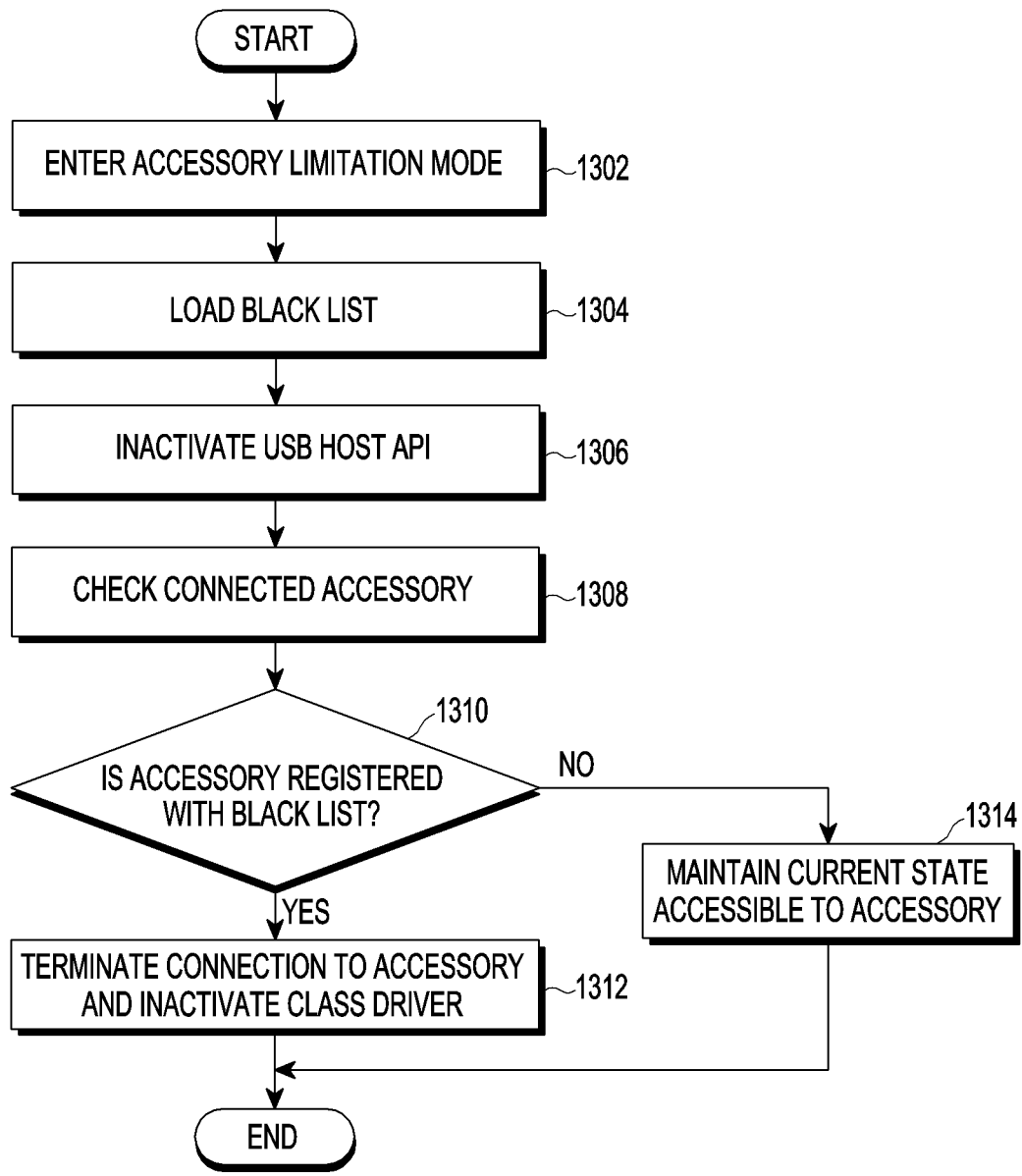
FIG. 13 is a flow chart illustrating a method of operating the electronic device according to various embodiments.

FIG. 13 is a flow chart illustrating a method of operating the electronic device according to various embodiments.

Referring to FIG. 13, in operation 1302, the electronic device 101 may enter a security mode, for instance an accessory limitation mode. In operation 1304, the processor 120 may read (or load) a black list. In operation 1306, the processor 120 may inactivate the USB host API.

In operation 1308, the processor 120 may check an external device (e.g., an accessory) connected to the interface 177 (e.g., the USB interface) or the connection terminal 178 (e.g., the USB connector) of the electronic device 101. According to an embodiment, before the electronic device 101 enters the accessory limitation mode, the USB core 330 may receive code information about a USB class code from the external device in an enumeration process of the external device connected to the electronic device 101. The processor 120 or the USB core 330 may check the external device (e.g., the accessory) connected to the electronic device 101 on the basis of the USB class code received from the accessory prior to entering the accessory limitation mode.

In operation 1310, the processor 120 or the USB core 330 may determine whether or not the external device (e.g., the accessory) is registered with the black list. For example, the processor 120 or the USB core 330 may determine whether or not the USB class code included in the code information received from the accessory is matched with any one of the USB class codes of the accessories registered with the black list. As a result of the determination of operation 1310, in a case where the external device is not registered with the black list (No in operation 1310), the processor 120 may control the electronic device 101 to maintain a current state in which the electronic device 101 can gain access to the external device in operation 1314. According to an embodiment, the processor 120 may control the electronic device 101 such that a class driver (e.g., a driver program) corresponding to the external device maintains an activated state in operation 1314, and such that a communication channel between the electronic device 101 and the external device is also maintained.

As a result of the determination of operation 1310, in a case where the accessory connected to the electronic device 101 is registered with the black list (Yes in operation 1310), the processor 120 may terminate the connection to the accessory in operation 1312, and inactivate (or remove) the class driver corresponding to the accessory. According to an embodiment, after operation 1312, the processor 120 ignores the USB class code received from the accessory, and does not perform the enumeration process on the accessory, and thereby the electronic device 101 cannot be made to gain access to the accessory.

Figure 14:
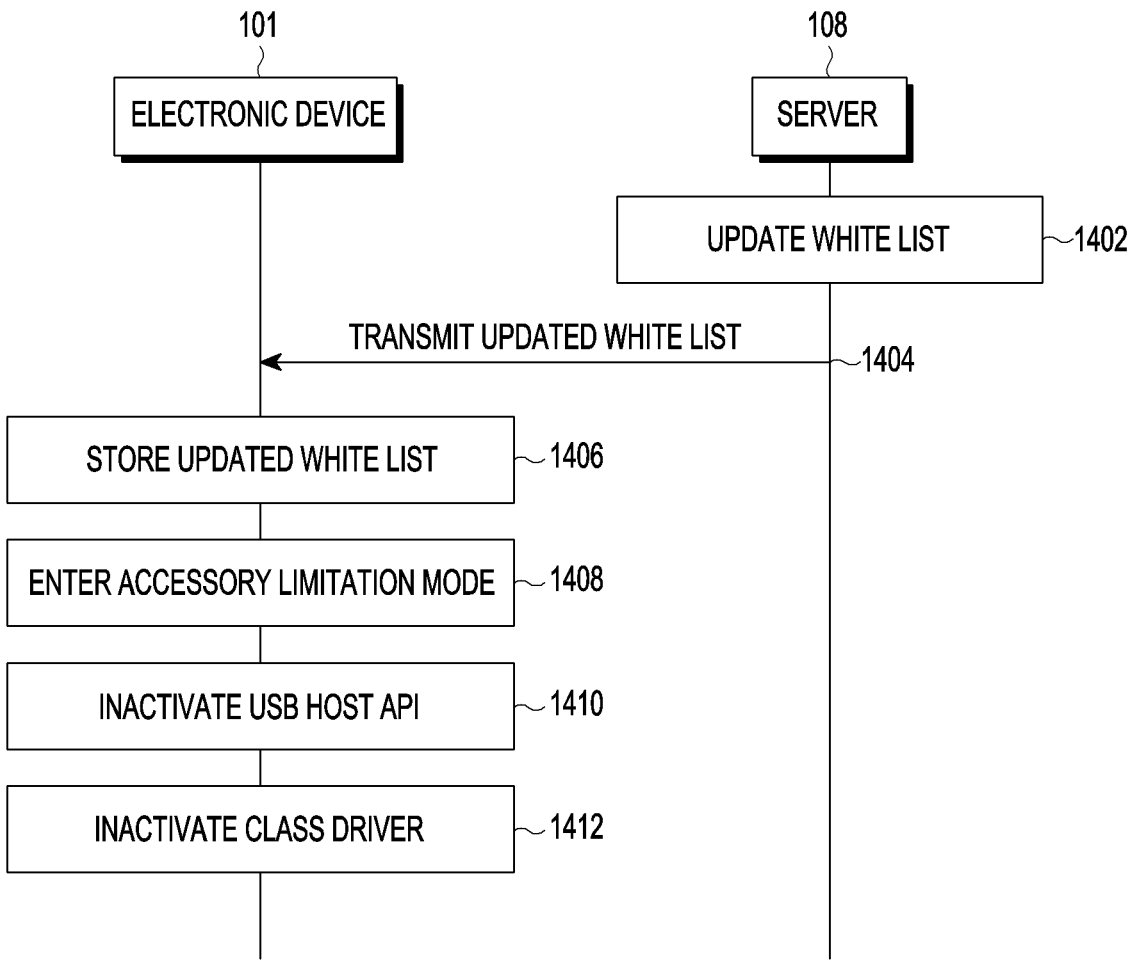
FIG. 14 is a flow chart illustrating a method of operating the electronic 101 device according to various embodiments.

FIG. 14 is a flow chart illustrating a method of operating the electronic device 101 according to various embodiments. In FIG. 14, it is assumed that an accessory limitation mode may be set at the request of the server 108 of the electronic device 101.

Referring to FIG. 14, in operation 1402, the server 108 may update a white list. In operation 1404, the server 108 may transmit the updated white list to the electronic device 101. According to an embodiment, the server 108 may update the white list or a black list at the request of the electronic device 101.

In operation 1406, the electronic device 101 may store the updated white list in the memory 130. Afterward, in operation 1408, the electronic device 101 may enter a security mode, for instance an accessory limitation mode. The electronic device 101 inactivates the USB host API in operation 1410, and the electronic device 101 inactivates (or removes) a class driver (e.g., a driver program) activated (or loaded) by the USB core 330 in operation 1412. Thereby, connection to an external device (e.g., an accessory) connected through the interface 177 or the connection terminal 178 can be terminated.

Figure 15:
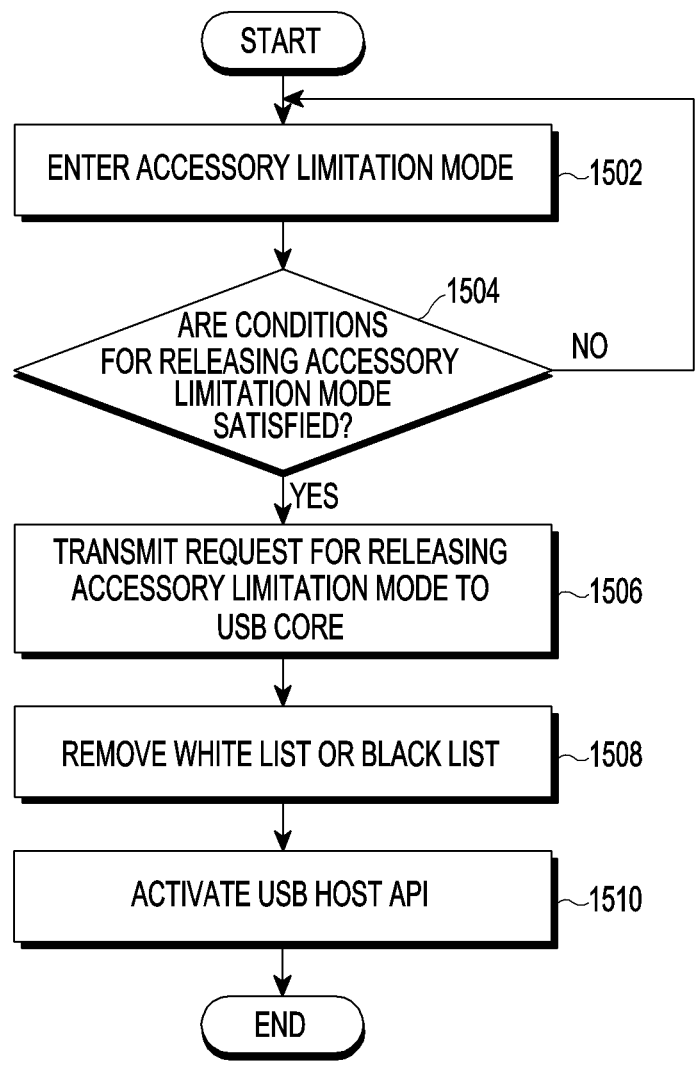
FIG. 15 is a flow chart illustrating a method of operating the electronic device according to various embodiments.

FIG. 15 is a flow chart illustrating a method of operating the electronic device according to various embodiments.

Referring to FIG. 15, in operation 1502, the electronic device 101 (e.g., the processor 120) may be in a state in which it enters a security mode, for instance an accessory limitation mode.

In operation 1504, the processor 120 may determine whether or not conditions for releasing the accessory limitation mode are satisfied. For example, in a case where input of a user for releasing the accessory limitation mode is input to the electronic device 101 from the user, in a case where a request for release of the accessory limitation mode is received from the outside, in a case where a current time is a preset time (e.g., AM 10:00), or in a case where the electronic device 101 leaves a preset place (e.g., a company), the conditions for releasing the accessory limitation mode may be satisfied. Further, in a case where it is not detected that a second user (e.g., a child, a student, etc.), to whom the use of the electronic device 101 or the external device (e.g., the accessory) connected to the electronic device 101 is limited by a first user (e.g., a parent, a teacher, etc.), gains access to the electronic device 101 or the external device, the conditions for releasing the accessory limitation mode may be satisfied. According to an embodiment, the conditions for releasing the accessory limitation mode may be preset inside the electronic device 101 or be received from the outside (e.g., the electronic device 102 or 104 or the server 108).

As a result of the determination of operation 1504, if the conditions for releasing the accessory limitation mode are not satisfied (No in operation 1504), the processor 120 may maintain the accessory limitation mode as in operation 1502.

As a result of the determination of operation 1504, if the conditions for releasing the accessory limitation mode are satisfied (Yes in operation 1504), the processor 120 may transmit the request for release of the accessory limitation mode to the USB core 330 in operation 1506. In operation 1506, the USB core 330 may remove the loaded white list or black list. In this case, a USB class code (e.g., a driver program) loaded by the USB core 330 may maintain an activated state.

In operation 1506, the USB core 330 may activate the USB host API. Since the accessory limitation mode is released, the USB core 330 activates the USB host API, and thereby the electronic device 101 may be made to be able to gain access to the external device (e.g., the accessory) through the USB file system 340.

According to an embodiment, operations 1508 and 1510 may be performed at the same time. According to another embodiment, operations 1510 may be omitted.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., a computer). The machine may invoke stored instructions from the storage medium and operate according to the invoked instructions, and may include an electronic device (e.g., the electronic device 101) according to the disclosed embodiments. When the instructions are executed by a processor (for example, the processor 120), the processor may perform functions corresponding to the instructions. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

The invention claimed is:

1. An electronic device comprising:
a display interface;
a universal serial bus (USB) interface comprising a USB 2.0 port and a USB 3.0 port;
a USB connecter comprising a first terminal and a second terminal;
a processor electrically connected to the USB interface and the display interface; and
a memory electrically connected to the processor,
wherein the memory stores instructions configured to, when executed, cause the processor to:
enter a security mode;
based on detecting communication connection between an external device and the electronic device via the USB connecter, establish a first connection between the first terminal and the display interface while blocking a second connection between the first terminal and the USB 3.0 port of the USB interface;
receive, from the external device connected to the electronic device via a third connection between the second terminal and the USB 2.0 port of the USB interface, a USB class code corresponding to the external device in the security mode;
determine whether the USB class code is included in a white list of connection allowable devices that are connectable to the electronic device in the security mode; and
control the communication connection between the external device and the electronic device according to whether the USB class code is included in the white list.

2. The electronic device of claim 1, wherein the instructions are configured to cause the processor to activate a class driver corresponding to the USB class code if the USB class code is included in the white list.

3. The electronic device of claim 1, wherein the instructions are configured to cause the processor to inactivate a class driver corresponding to the USB class code if the USB class code is not included in the white list.

4. The electronic device of claim 1, wherein the instructions are configured to cause the processor to terminate connection to at least one first external device connected through the USB interface prior to entering the security mode if the electronic device enters the security mode.

5. The electronic device of claim 4, wherein the instructions are configured to cause the processor to terminate connection to the at least one first external device by inactivating a USB host API allowing an access to the at least one first external device or at least one class driver corresponding to the USB class code of the at least one first external device.

6. The electronic device of claim 4, wherein the instructions are configured to cause the processor to:
receive a first USB class code corresponding to the at least one first external device from the at least one first external device if a reference time has elapsed after the connection to the at least one first external device connected prior to entering the security mode is terminated; and
determine whether or not the first USB class code is included in the white list.

7. The electronic device of claim 4, wherein the instructions are configured to cause the processor to:
determine whether or not a first USB class code corresponding to the at least one first external device is included in the white list prior to terminating connection to the at least one first external device; and
maintain the connection between the electronic device and the at least one first external device if the first USB class code is included in the white list.

8. The electronic device of claim 1, wherein the instructions are configured to cause the processor to:
read a black list of connection unallowable devices that are not connectable in the security mode if the electronic device enters the security mode;
terminate connection to at least one first external device connected through the USB interface prior to entering the security mode;
determine whether or not a second USB class code corresponding to a second external device is included in the black list if the second external device is detected; and
activate a class driver corresponding to the second USB class code if the second USB class code is not included in the black list.

9. The electronic device of claim 8, wherein the instructions are configured to cause the processor to maintain the connection between the electronic device and the at least one first external device if a first USB class code corresponding to the at least one first external device is not included in the black list prior to terminating connection to the at least one first external device.

10. The electronic device of claim 1, wherein the instructions are configured to cause the processor to enter the security mode in a case where a request for entering the security mode is received from another external device, in a case where input of a user for entering the security mode is input to the electronic device, in a case where it becomes a time pre-stored in the memory, in a case where the electronic device is located in a place pre-stored in the memory, or in a case where an access of the user to which use of the electronic device is limited is detected.

11. The electronic device of claim 1, wherein, if the white list is updated by another device that requests entry of the security mode to the electronic device, the instructions are configured to cause the processor to receive the updated white list from the other device.

12. A method of operating an electronic device comprising:

entering a security mode;

based on detecting communication connection between an external device and the electronic device via a USB connecter of the electronic device, establish a first connection between a first terminal of the USB connecter and a display interface of the electronic device while blocking a second connection between the first terminal and a USB 3.0 port of a USB interface;

receiving, from the external device connected through a third connection between a second terminal of the USB connecter and a USB 2.0 port of the USB interface of the electronic device, a USB class code corresponding to the external device in the security mode;

determining whether the USB class code is included in a white list of connection allowable devices that are connectable to the electronic device in the security mode; and controlling the communication connection between the external device and the electronic device according to whether the USB class code is included in the white list.

13. The method of claim 12, wherein the controlling of the communication connection between the external device and the electronic device according to whether the USB class code is included in the white list includes activating a class driver corresponding to the USB class code if the USB class code is included in the white list.

14. The method of claim 12, wherein the controlling of the communication connection between the external device and the electronic device according to whether the USB class code is included in the white list includes inactivating a class driver corresponding to the USB class code if the USB class code is not included in the white list.

15. The method of claim 12, further comprising:

terminating connection to at least one first external device connected in advance through the USB interface if the electronic device enters the security mode.

* * * * *